United States Patent
Ikeda et al.

(10) Patent No.: US 11,550,430 B2
(45) Date of Patent: Jan. 10, 2023

(54) INFORMATION PROCESSING APPARATUS, INFORMATION PROCESSING METHOD, AND RECORDING MEDIUM

(71) Applicant: SONY GROUP CORPORATION, Tokyo (JP)

(72) Inventors: Takuya Ikeda, Tokyo (JP); Kentaro Ida, Tokyo (JP); Osamu Shigeta, Tokyo (JP); Kazuma Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/309,985

(22) PCT Filed: Dec. 27, 2019

(86) PCT No.: PCT/JP2019/051426
§ 371 (c)(1),
(2) Date: Jul. 7, 2021

(87) PCT Pub. No.: WO2020/149148
PCT Pub. Date: Jul. 23, 2020

(65) Prior Publication Data
US 2022/0057892 A1    Feb. 24, 2022

(30) Foreign Application Priority Data
Jan. 18, 2019    (JP) .............................. JP2019-007069

(51) Int. Cl.
*G06F 3/042* (2006.01)
*G06F 3/01* (2006.01)
(Continued)

(52) U.S. Cl.
CPC ............ *G06F 3/0425* (2013.01); *G06F 3/011* (2013.01); *G06F 3/038* (2013.01); *G06F 3/0346* (2013.01)

(58) Field of Classification Search
CPC ...... G06F 3/0425; G06F 3/011; G06F 3/0346; G06F 3/038; G06F 3/017; G03B 21/14;
(Continued)

(56) References Cited

U.S. PATENT DOCUMENTS

2010/0265175 A1  10/2010  Kabasawa et al.
2015/0355867 A1*  12/2015  Yoshida ............... H04N 1/0035
                                                  358/1.15

(Continued)

FOREIGN PATENT DOCUMENTS

CN    101606120 A    12/2009
CN    109643159 A    4/2019
(Continued)

OTHER PUBLICATIONS

International Search Report and Written Opinion of PCT Application No. PCT/JP2019/051426, dated Feb. 18, 2020, 08 pages of ISRWO.

*Primary Examiner* — Jonathan A Boyd
(74) *Attorney, Agent, or Firm* — Chip Law Group

(57) ABSTRACT

The present technology relates to an information processing apparatus, an information processing method, and a recording medium that can improve user's operability on a video image. The information processing apparatus includes: a coordinate system setting unit configured to change an input coordinate system on the basis of a user operation; and a video image control unit configured to control a content in a video image on the basis of a first input coordinate system, and control a display position of the video image on the basis of a second input coordinate system. The present technology can be applied to, for example, a system for displaying a (Continued)

video image on a wall or the like of a room by using a drive-type display device capable of moving a display position of the video image.

21 Claims, 36 Drawing Sheets

(51) Int. Cl.
*G06F 3/0346* (2013.01)
*G06F 3/038* (2013.01)

(58) Field of Classification Search
CPC .... G06V 40/28; H04N 9/3179; H04N 9/3194; G09G 5/00; G09G 5/36; G09G 5/38
See application file for complete search history.

(56) References Cited

U.S. PATENT DOCUMENTS

2018/0059777 A1\* 3/2018 Kobayashi .......... G06F 3/04842
2019/0302964 A1 10/2019 Kyosuna et al.

FOREIGN PATENT DOCUMENTS

| | | |
|---|---|---|
| DE | 202017104928 U1 | 11/2017 |
| EP | 2219101 A1 | 8/2010 |
| EP | 3504608 A1 | 7/2019 |
| JP | 2014-167800 A | 9/2014 |
| JP | 2015-158707 A | 9/2015 |
| JP | 2019-532396 A | 11/2019 |
| KR | 10-2010-0086931 A | 8/2010 |
| KR | 10-2019-0031551 A | 3/2019 |
| TW | 200941302 A | 10/2009 |
| WO | 2009/072504 A1 | 6/2009 |
| WO | 2017/208628 A1 | 12/2017 |
| WO | 2018/039069 A1 | 3/2018 |
| WO | 2018/079446 A1 | 5/2018 |

\* cited by examiner

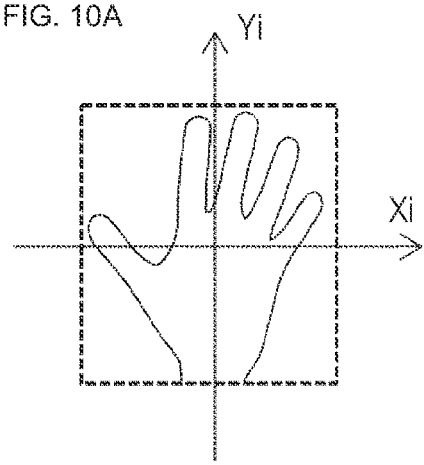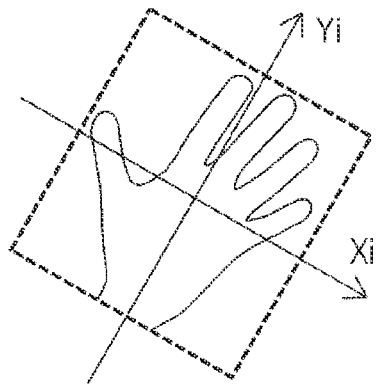
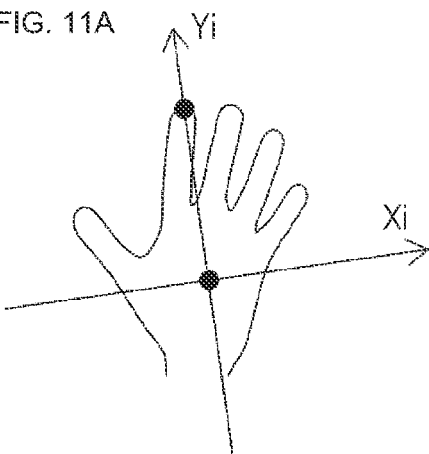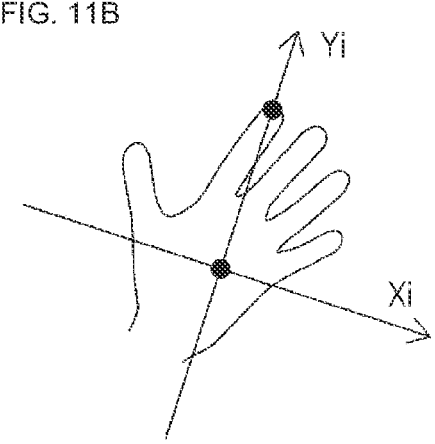

FIG. 12

| TYPE OF USER OPERATION | OPERATION METHOD |
|---|---|
| UI OPERATION | SLIDING OR TAPPING WITH ONE FINGER PINCHING IN OR PINCHING OUT WITH TWO FINGERS |
| LOCAL MOVEMENT OF VIDEO IMAGE | SLIDING WITH THREE FINGERS |
| SPATIAL MOVEMENT OF VIDEO IMAGE | SLIDING WITH FIVE FINGERS OR ENTIRE PALM |

FIG. 19
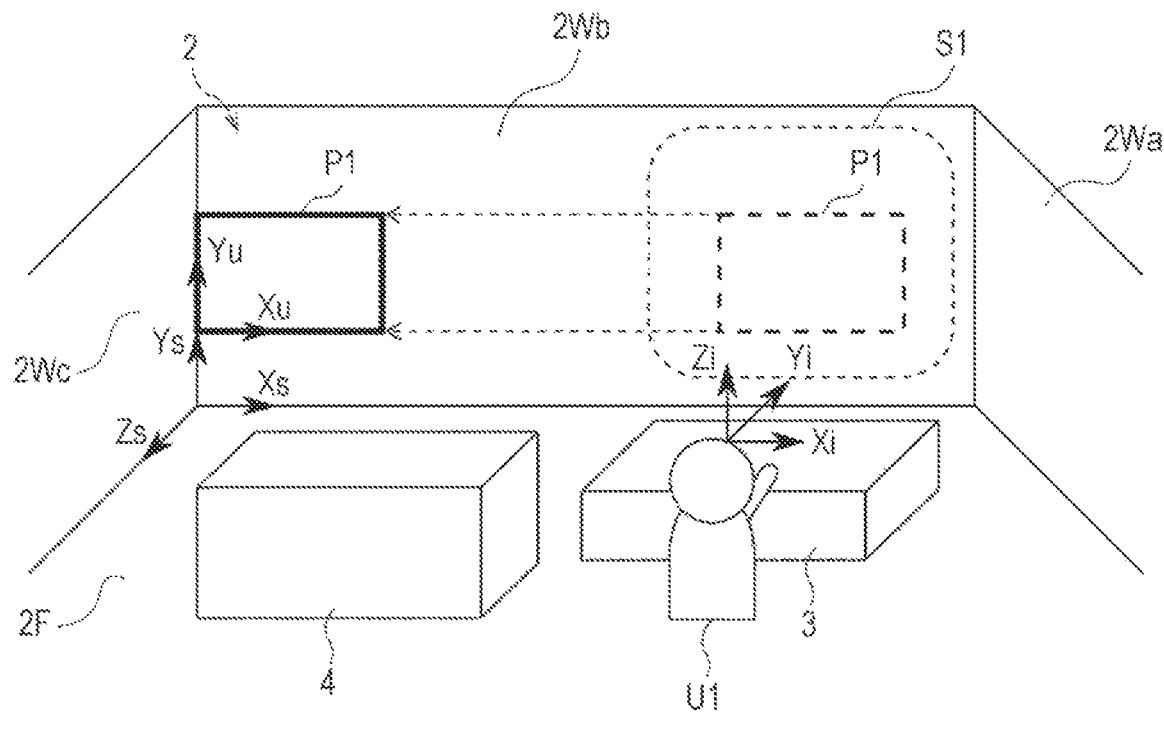
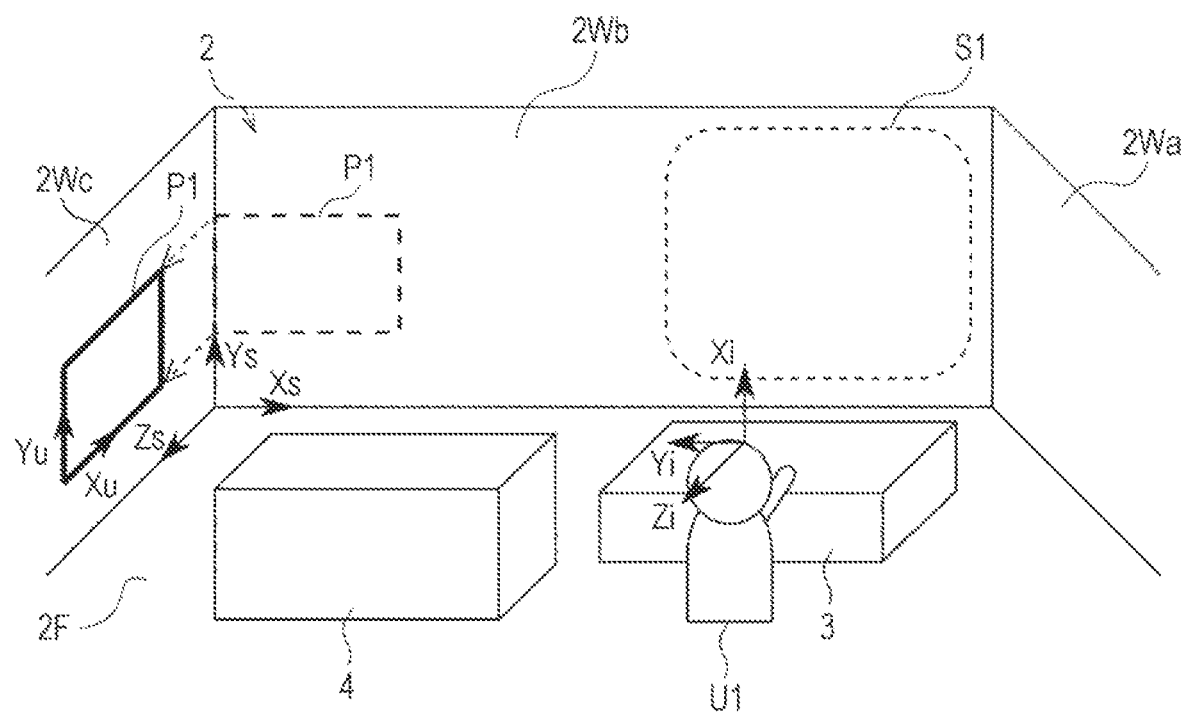

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2019/051426 filed on Dec. 27, 2019, which claims priority benefit of Japanese Patent Application No. JP 2019-007069 filed in the Japan Patent Office on Jan. 18, 2019. Each of the above-referenced applications is hereby incorporated herein by reference in its entirety.

TECHNICAL FIELD

The present technology relates to an information processing apparatus, an information processing method, and a recording medium, and particularly relates to an information processing apparatus, an information processing method, and a recording medium that improve user's operability on a video image.

BACKGROUND ART

Conventionally, it has been proposed to set an input coordinate system on the basis of an orientation of a finger of a user's hand in a case where the user's hand is used to remotely control a video image projected on a wall or the like (see, for example, Patent Document 1).

CITATION LIST

Patent Document

Patent Document 1: International Publication No. 2017/208628

SUMMARY OF THE INVENTION

Problems to be Solved by the Invention

However, the input coordinate system set on the basis of an orientation of a finger of a user's hand is not always appropriate. For example, in a case where the user imagines different input coordinate systems between an operation on a content in the video image and an operation for moving a display position of the video image, using the same input coordinate system can confuse the user.

The present technology has been made in view of such a situation, and is intended to improve user's operability on a video image.

Solutions to Problems

An information processing apparatus of one aspect of the present technology includes: a coordinate system setting unit configured to change an input coordinate system on the basis of a user operation; and a video image control unit configured to control a content in a video image on the basis of a first input coordinate system, and control a display position of the video image on the basis of a second input coordinate system.

An information processing method of one aspect of the present technology includes, by an information processing apparatus: changing an input coordinate system on the basis of a user operation; and controlling a content in a video image on the basis of a first input coordinate system, and controlling a display position of the video image on the basis of a second input coordinate system.

A recording medium of one aspect of the present technology records a program for executing processing of: changing an input coordinate system on the basis of a user operation; and controlling a content in a video image on the basis of a first input coordinate system, and controlling a display position of the video image on the basis of a second input coordinate system.

In one aspect of the present technology, an input coordinate system is changed on the basis of a user operation, and a content in a video image is controlled and a display position of the video image is controlled on the basis of a user operation in the input coordinate systems that are different.

BRIEF DESCRIPTION OF DRAWINGS

FIGS. 10A and 10B are views showing a second example of the method of setting the input coordinate system.

FIGS. 11A and 11B are views showing a third example of the method of setting the input coordinate system.

FIG. 12 is a view for explaining an example of a type of user operation.

FIG. 19 is a view showing the second example of the coordinate system and the display position of the video image.

MODE FOR CARRYING OUT THE INVENTION

Hereinafter, an embodiment for implementing the present technology will be described. The description will be given in the following order.
1. Embodiment
2. Modified Example
3. Other 1. Embodiment An embodiment of the present technology will be described with reference to FIGS. 1, 2, 3, 4, 5, 6, 7, 8, 9A, 9B, 10A, 10B, 11A, 11B, 12, 13, 14, 15, 16, 17, 18, 19, 20, 21, 22, 23, 24, 25, 26, 27, 28, 29, 30, 31, 32, 33, 34, 35, 36, and 37.

<Configuration Example and Installation Example of Information Processing System 1>

Figure 1:
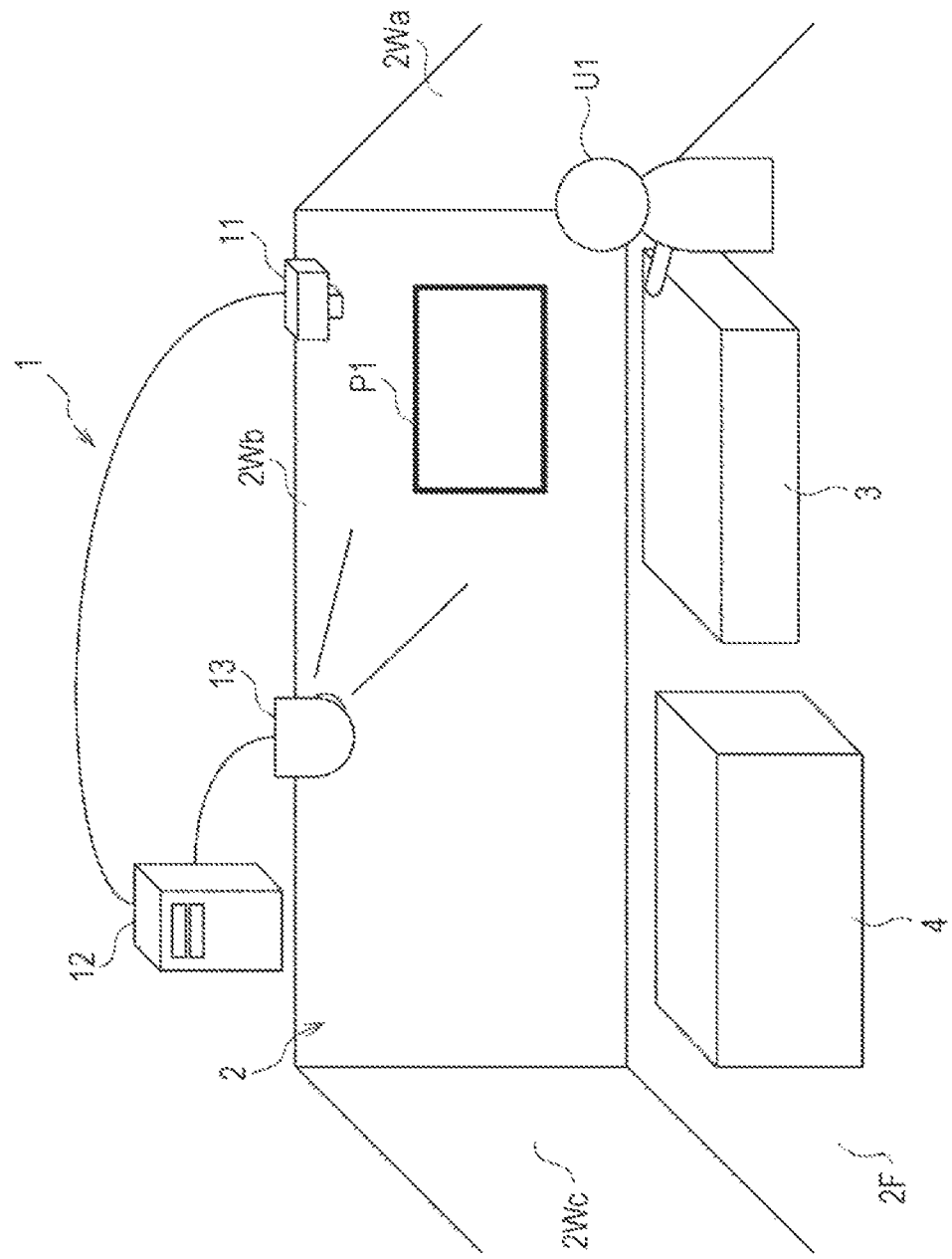
FIG. 1 is a view showing a configuration example and an installation example of an information processing system to which the present technology is applied.

FIG. 1 shows a configuration example and an installation example of an information processing system 1.

FIG. 1 shows an example in which the information processing system 1 is installed in a room 2. The room 2 is a rectangular parallelepiped space surrounded by a ceiling 2C, a floor 2F, and walls 2Wa to 2Wd in four directions (the wall 2Wd is not illustrated). The room 2 is a display space in which a video image is displayed by the information processing system 1. In the room 2, a desk 3 and a desk 4 are arranged.

The information processing system 1 includes a detection device 11, an information processing apparatus 12, and a drive-type display device 13. The detection device 11 and the drive-type display device 13 are provided on the ceiling 2C, for example. The information processing apparatus 12 may be provided either inside or outside the room 2.

The detection device 11 captures a three-dimensional depth image (hereinafter, referred to as a user image) for detecting a user operation by a user U1. The detection device 11 transmits user image data including the user image to the information processing apparatus 12.

The information processing apparatus 12 detects a user operation on the basis of the user image data. Furthermore, the information processing apparatus 12 generates a model having a three-dimensional shape (hereinafter, referred to as a display space model) of the display space (for example, inside of the room 2) on the basis of environment image data supplied from the drive-type display device 13. The information processing apparatus 12 performs output control of a video image and sound of the drive-type display device 13, on the basis of the detected user operation, the display space model, and the like.

The drive-type display device 13 is a display device capable of changing a display position (projection position) of a video image. Under the control of the information processing apparatus 12, the drive-type display device 13 projects a video image at any position in the display space, and outputs sound in accordance with the video image. Furthermore, the drive-type display device 13 captures a three-dimensional depth image (hereinafter, referred to as an environment image) for generating the display space model. The drive-type display device 13 supplies environment image data including the environment image to the information processing apparatus 12.

<Detailed Configuration Example of Information Processing System 1>

Figure 2:
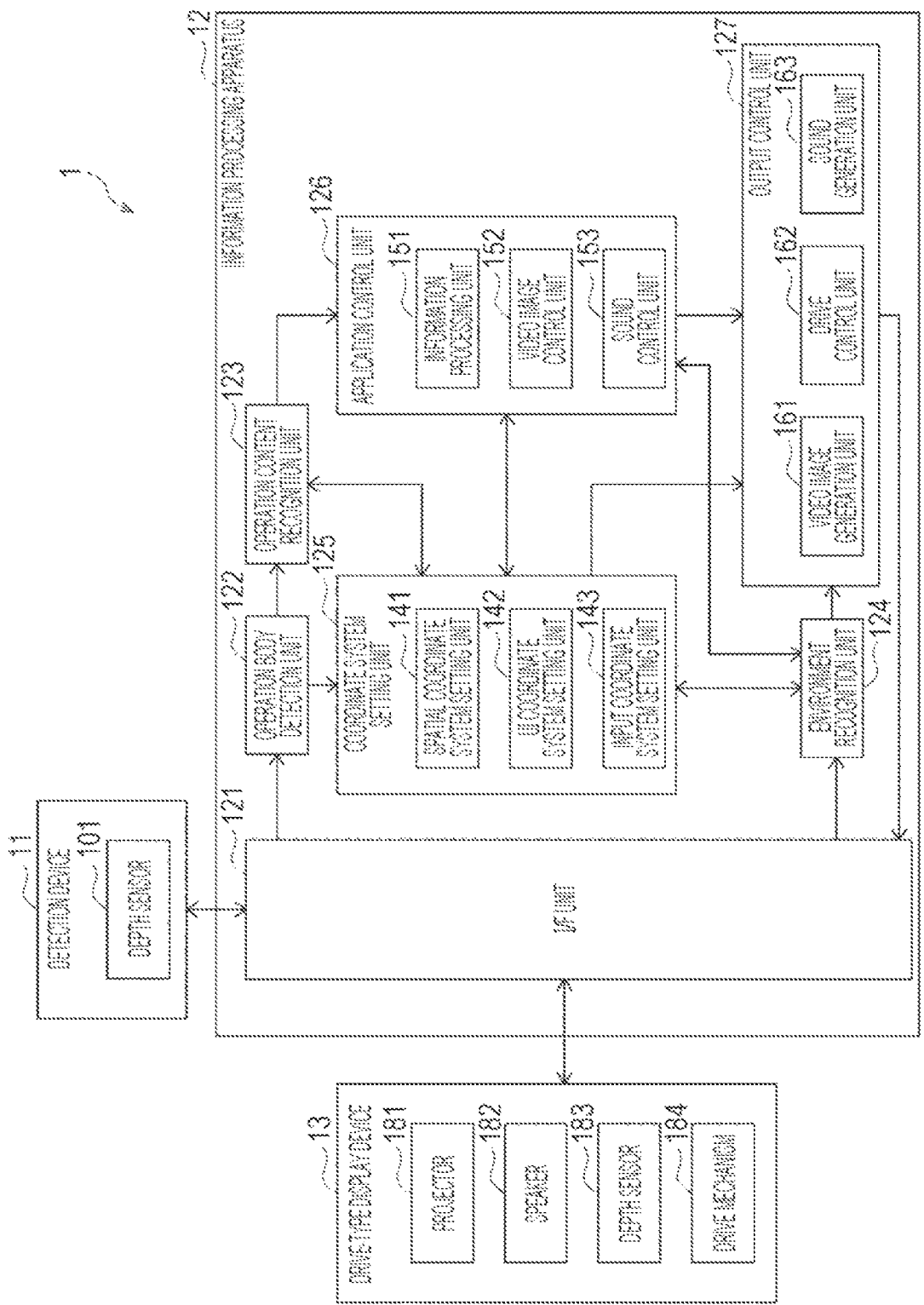
FIG. 2 is a block diagram showing a detailed configuration example of the information processing system.

FIG. 2 shows a detailed configuration example of the information processing system 1.

The detection device 11 includes a depth sensor 101.

As the depth sensor 101, for example, any system of depth sensor such as a time of flight (ToF) system using infrared light, a Light Coding system, and an active stereo system is used. The depth sensor 101 captures a user image and supplies obtained user image data to the information processing apparatus 12.

The information processing apparatus 12 includes an I/F (interface) unit 121, an operation body detection unit 122, an operation content recognition unit 123, an environment recognition unit 124, an application control unit 126, and an output control unit 127.

The I/F unit 121 transmits and receives various data to and from the detection device 11 and the drive-type display device 13. The I/F unit 121 supplies data received from the detection device 11 and the drive-type display device 13 to each unit of the information processing apparatus 12, and transmits the data acquired from each unit of the information processing apparatus 12 to the detection device 11 or the drive-type display device 13.

The operation body detection unit 122 receives user image data from the depth sensor 101 via the I/F unit 121. The operation body detection unit 122 performs detection processing and tracking processing of a hand of the user U1, which is an operation body of the user U1, in the user image. The operation body detection unit 122 supplies operation body information including the user image and information indicating a position of a hand of the user U1 in the user image, to the operation content recognition unit 123 and a coordinate system setting unit 125.

On the basis of the operation body information, the operation content recognition unit 123 recognizes a content of a user operation and a position where the user operation is performed. Note that the position where the user operation is performed is represented by using an input coordinate system set by an input coordinate system setting unit 143 of the coordinate system setting unit 125. The operation content recognition unit 123 supplies information indicating a content of the user operation to the coordinate system setting unit 125, and supplies user operation information including the content and a position of the user operation to the application control unit 126.

The environment recognition unit 124 receives environment image data from a depth sensor 183 of the drive-type display device 13 via the I/F unit 121. On the basis of the environment image data, the environment recognition unit 124 performs a display space model generation process, and a position recognition process for the detection device 11 and the drive-type display device 13 in the display space. The environment recognition unit 124 supplies information indicating the display space model to the coordinate system setting unit 125, the application control unit 126, and a video image generation unit 161. The environment recognition unit 124 supplies information indicating the positions of the detection device 11 and the drive-type display device 13, to the coordinate system setting unit 125 and the video image generation unit 161. Furthermore, the environment recognition unit 124 instructs a drive control unit 162 of the output control unit 127, of an image-capturing direction of an environment image by the depth sensor 183.

The coordinate system setting unit 125 performs setting processing for various coordinate systems. The coordinate system setting unit 125 includes a spatial coordinate system setting unit 141, a UI (user interface) coordinate system setting unit 142, and the input coordinate system setting unit 143.

The spatial coordinate system setting unit 141 sets a spatial coordinate system, which is a coordinate system for representing a position in the display space, on the basis of the display space model or the like. The spatial coordinate system setting unit 141 supplies information indicating the set spatial coordinate system, to the environment recognition unit 124, the application control unit 126, and the output control unit 127.

The UI coordinate system setting unit 142 sets a UI coordinate system on the basis of the display space model, display position information indicating a display position of a video image supplied from a video image control unit 152 of the application control unit 126, and the like. The UI coordinate system is a coordinate system for representing a position in a video image displayed by the drive-type display device 13. The UI coordinate system setting unit 142 supplies information indicating the set UI coordinate system to the application control unit 126.

The input coordinate system setting unit 143 sets an input coordinate system on the basis of the operation body information, the user operation information, the display space model, the display position information indicating a display position of the video image supplied from the video image control unit 152 of the application control unit 126, and the like. The input coordinate system setting unit 143 supplies information indicating the set input coordinate system to the operation content recognition unit 123 and the application control unit 126.

The application control unit 126 performs predetermined information processing by executing various application programs, and controls a video image and sound outputted by the drive-type display device 13. The application control unit 126 includes an information processing unit 151, the video image control unit 152, and a sound control unit 153.

The information processing unit 151 performs predetermined information processing by executing various application programs.

The video image control unit 152 controls a video image outputted from the drive-type display device 13, on the basis of the user operation information, a result of information processing by the information processing unit 151, and the like. For example, the video image control unit 152 controls a content in the video image (hereinafter, also referred to as a video image content), a display position of the video image, and the like. The video image control unit 152 supplies video image information including the video image content and the information indicating the display position of the video image, to the output control unit 127.

The sound control unit 153 controls sound outputted from the drive-type display device 13, on the basis of the user operation information, a result of information processing by the information processing unit 151, and the like. For example, the sound control unit 153 controls a content of sound (hereinafter, referred to as a sound content) and the like. The sound control unit 153 supplies sound information including information indicating the sound content, to the output control unit 127.

The output control unit 127 controls an output of a video image and sound by the drive-type display device 13. The output control unit 127 includes the video image generation unit 161, the drive control unit 162, and a sound generation unit 163.

The video image generation unit 161 generates video image data for displaying a video image including a video image content set by the video image control unit 152, at a display position set by the video image control unit 152. The video image generation unit 161 supplies the generated video image data to the drive-type display device 13 via the I/F unit 121.

The drive control unit 162 controls a drive mechanism 184 of the drive-type display device 13 via the I/F unit 121 such that a video image is displayed at a display position set by the video image control unit 152.

The sound generation unit 163 generates sound data for outputting sound including a sound content set by the sound control unit 153. The sound generation unit 163 supplies the generated sound data to the drive-type display device 13 via the I/F unit 121.

The drive-type display device 13 includes a projector 181, a speaker 182, the depth sensor 183, and the drive mechanism 184.

The projector 181 projects a video image based on video image data received from the video image generation unit 161, onto the display space.

The speaker 182 outputs sound based on the sound data received from the sound generation unit 163. Note that the speaker 182 may be configured by a general speaker, or may be configured by an ultrasonic speaker having high directivity. In a case where the speaker 182 is configured by an ultrasonic speaker, for example, the speaker 182 is installed such that an output direction of ultrasonic waves is parallel to a projection direction of the projector 181.

As the depth sensor 183, any system of depth sensor is used similarly to the depth sensor 101. The depth sensor 183 captures an environment image, and supplies the obtained environment image data to the information processing apparatus 12.

Note that it is desirable that the projector 181 and the depth sensor 183 are placed as close as possible, and a projection direction of the projector 181 and a detection direction of the depth sensor 183 are as parallel as possible. As a result, accuracy in a case of geometrically correcting a video image outputted from the projector 181 is improved on the basis of a detection result of the depth sensor 183.

The drive mechanism 184 includes a mechanism for movement of a display position (projection position) of a video image of the projector 181.

<Configuration Example of Drive-Type Display Device 13>

Next, a configuration example of the drive-type display device 13 will be described with reference to FIGS. 3 and 4.

Figure 3:
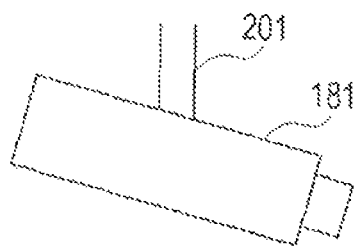
FIG. 3 is a view showing a first configuration example of a drive-type display device.

FIG. 3 schematically shows a configuration example of the drive-type display device 13 in which the projector 181 is movable. Specifically, the projector 181 is supported by a support member 201. Any configuration of the support member 201 may be adopted. For example, the support member 201 may be a type suspended from a ceiling or a type placed on a floor. Then, in the state of being supported by the support member 201, by changing a direction of the projector 181 with the drive mechanism 184 (not illustrated), a display position of a video image projected by the projector 181 moves.

Figure 4:
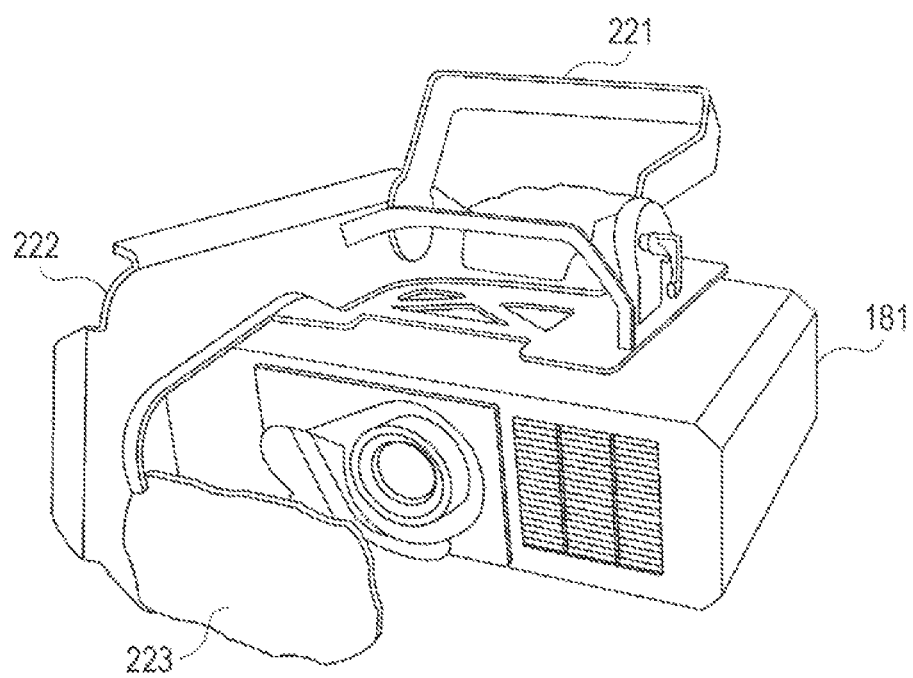
FIG. 4 is a view showing a second configuration example of the drive-type display device.

FIG. 4 shows a configuration example of the drive-type display device 13 in which the projector 181 is fixed. Specifically, the projector 181 is suspended from a ceiling or the like by using, for example, an installation member 221. Furthermore, in front of a lens of the projector 181, a mirror 223 supported by a support member 222 is provided. Then, while being supported by the support member 212, when a direction of the mirror 223 is changed by the drive mechanism 184 (not illustrated), a display position of a video image projected by the projector 181 moves.

Note that, in the following, a description is mainly given to an example of a case of the drive-type display device 13 in which the projector 181 is movable.

<Display Space Model Generation Process>

Figure 5:
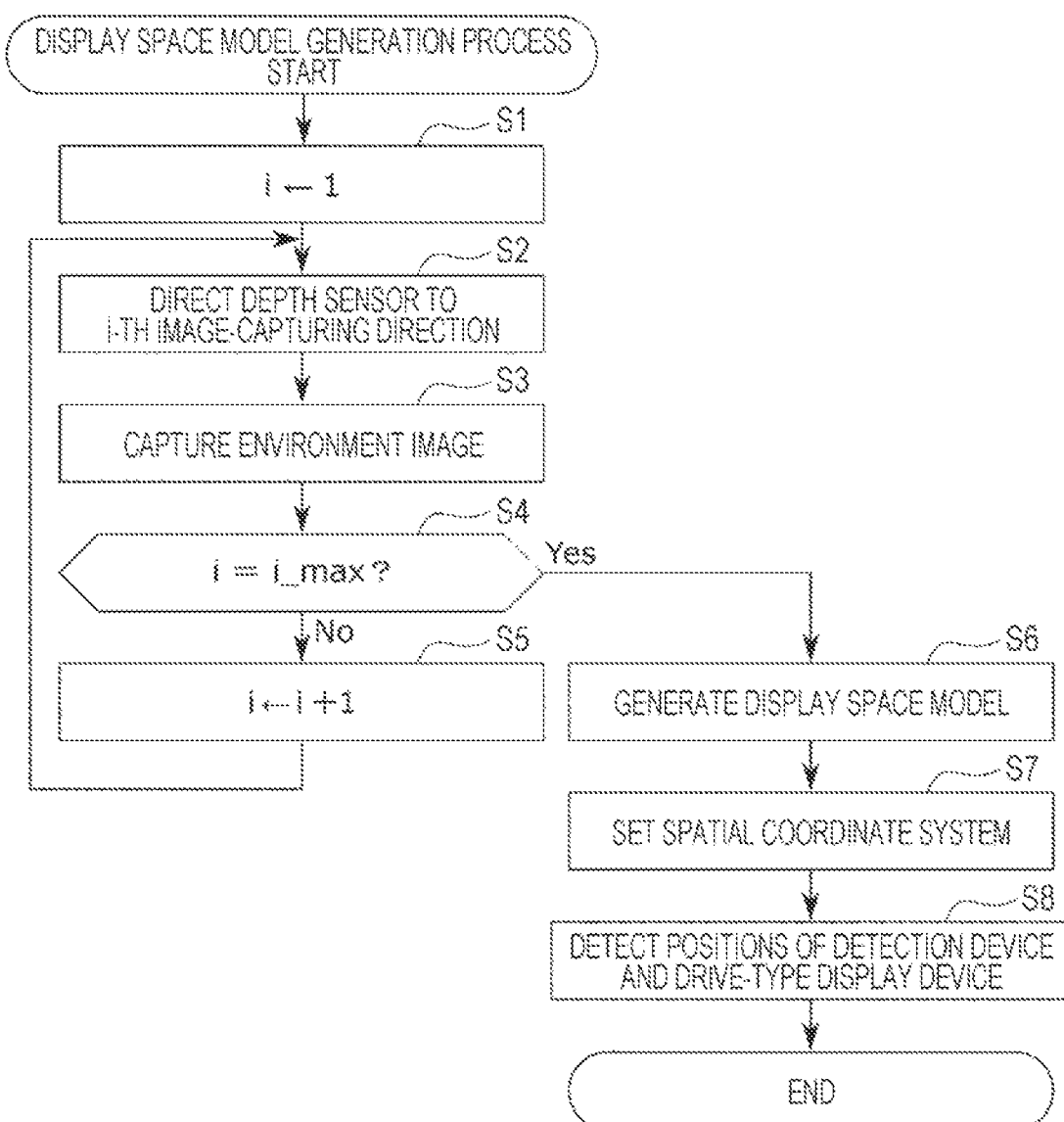
FIG. 5 is a flowchart for explaining a display space model generation process.

Next, a display space model generation process executed by the information processing system 1 will be described with reference to a flowchart of FIG. 5.

This process is executed, for example, when the information processing system 1 is installed in a display space, or when the display space is changed.

In step S1, the environment recognition unit 124 assigns 1 to a variable i.

Note that the variable i is a variable indicating an image-capturing direction of an environment image. Image-capturing directions from the first to i_max-th are set in advance such that an image of the entire display space (for example, inside of the room 2) can be captured within a range in which the depth sensor 183 can be driven. For example, each image-capturing direction is set such that the i-th image-capturing direction is a pan angle Pi and a tilt angle Ti.

In step S2, the drive-type display device 13 directs the depth sensor 183 in the i-th image-capturing direction. Specifically, the environment recognition unit 124 instructs the drive control unit 162 to direct the depth sensor 183 in the i-th image-capturing direction. The drive control unit 162 directs the depth sensor 183 in the i-th image-capturing direction by controlling the drive mechanism 184 of the drive-type display device 13 via the I/F unit 121 to change the direction of the drive-type display device 13.

In step S3, the depth sensor 183 captures an environment image. That is, the depth sensor 183 captures an environment image in the i-th image-capturing direction. The depth sensor 183 supplies obtained environment image data to the environment recognition unit 124 via the I/F unit 121.

In step S4, the environment recognition unit 124 determines whether or not the variable i is equal to i_max. In a case where it is determined that the variable i is not equal to i_max, the process proceeds to step S5.

In step S5, the environment recognition unit 124 increments a value of the variable i by one.

Thereafter, the process returns to step S2, and the processes of steps S2 to S5 are repeatedly executed until it is determined in step S4 that the variable i is equal to i_max. As a result, the environment images in the image-capturing directions from the first to the i_max-th are captured.

Whereas, in a case where it is determined in step S4 that the variable i is equal to i_max, the process proceeds to step S6.

In step S6, the environment recognition unit 124 generates a display space model. That is, the environment recognition unit 124 generates a display space model that represents a three-dimensional shape of the entire display space, by integrating environment images that represent a three-dimensional shape of each image-capturing direction in the display space. The environment recognition unit 124 supplies information indicating the display space model, to the coordinate system setting unit 125, the application control unit 126, and the output control unit 127.

Note that, any method can be used to generate the display space model.

In step S7, the spatial coordinate system setting unit 141 sets a spatial coordinate system. That is, the spatial coordinate system setting unit 141 sets a spatial coordinate system for representing a position in the display space, on the basis of the display space model. The spatial coordinate system setting unit 141 supplies information indicating the spatial coordinate system, for example, information indicating a position of the spatial coordinate system in the display space model, to the environment recognition unit 124, the application control unit 126, and the output control unit 127.

Figure 6:
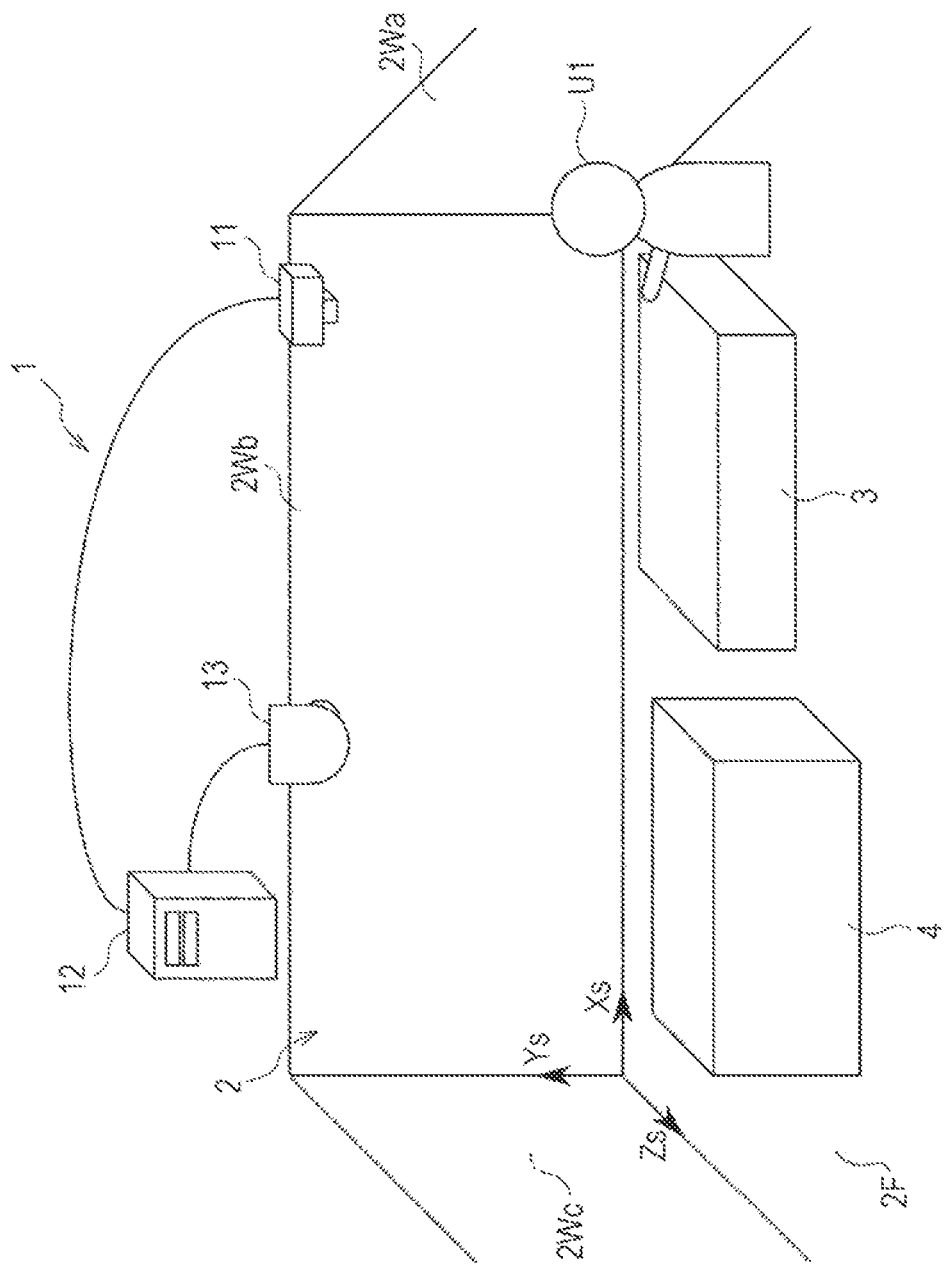
FIG. 6 is a view showing an example of a spatial coordinate system.

Note that the spatial coordinate system can be set to any coordinate system as long as a position in the display space can be represented. For example, as shown in FIG. 6, the spatial coordinate system is set in which an origin is an intersection of the wall 2Wb, the wall 2Wc, and the floor 2F of the room 2, and an Xs axis is a direction in which the wall 2Wb extends in a lateral direction, a Ys axis is a vertical upward direction, and a Zs axis is a direction in which the wall 2Wc extends in a lateral direction.

In step S8, the environment recognition unit 124 detects positions of the detection device 11 and the drive-type display device 13. Specifically, the environment recognition unit 124 detects the positions of the detection device 11 and the drive-type display device 13 in the spatial coordinate system on the basis of the display space model. The environment recognition unit 124 supplies information indicating the positions of the detection device 11 and the drive-type display device 13, to the coordinate system setting unit 125 and the output control unit 127.

The position of the drive-type display device 13 is used, for example, to calculate a position and an orientation of the projector 181, which is for displaying a video image at a desired position. The position of the detection device 11 is used to calculate a position and an orientation of the depth sensor 101, and the position and the orientation of the depth sensor 101 are used to set the input coordinate system.

Thereafter, the display space model generation process is terminated.

<Output Control Process>

Figure 7:
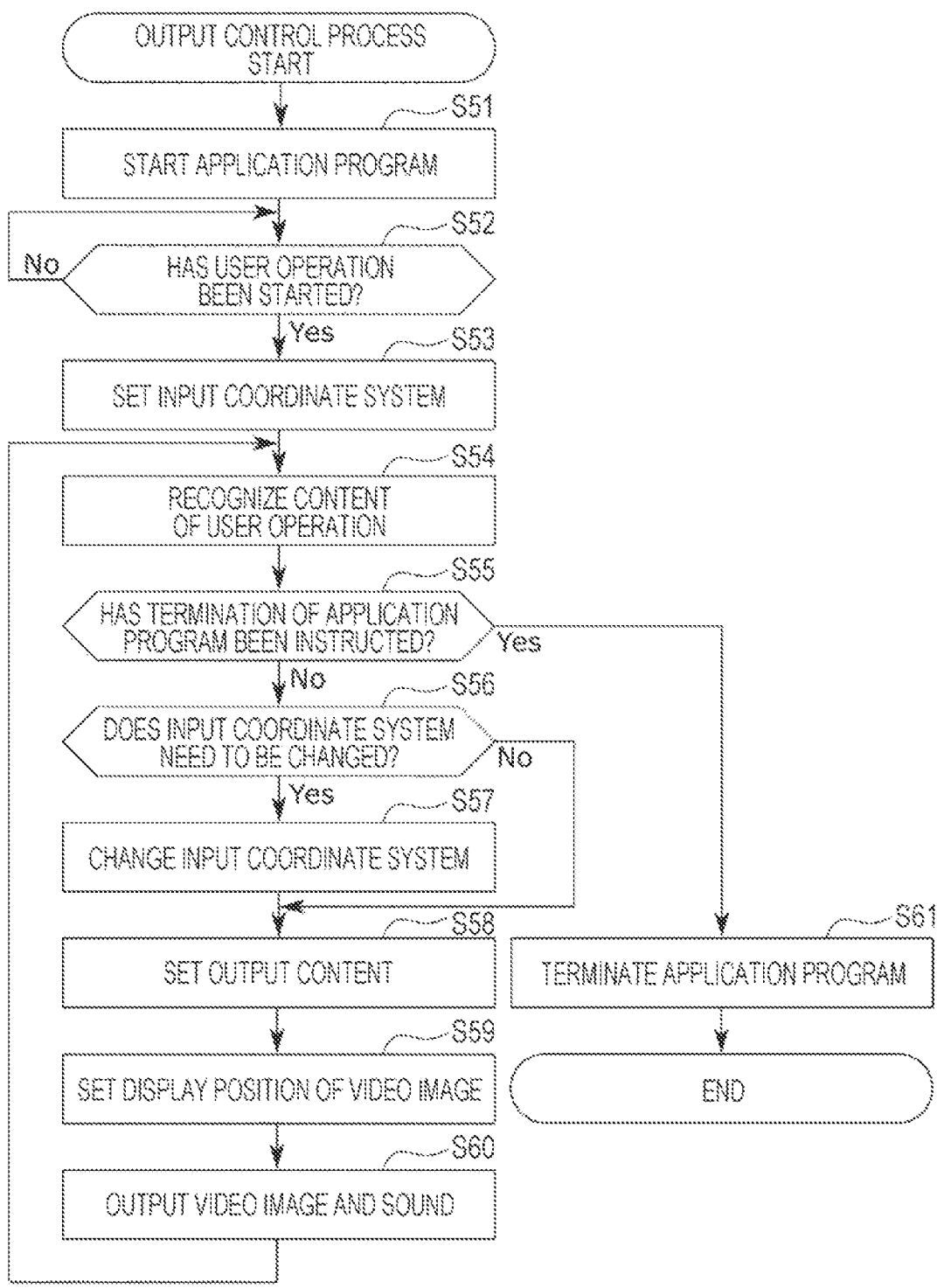
FIG. 7 is a flowchart for explaining an output control process.
Figure 8:
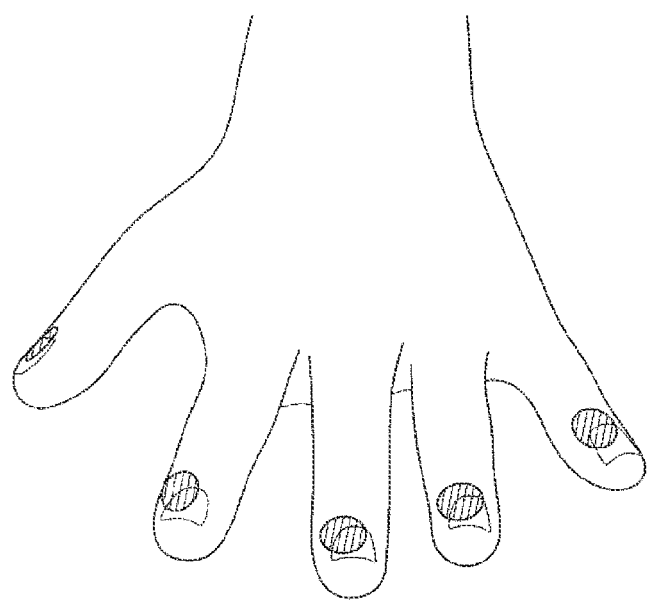
FIG. 8 is a view for explaining a hand position detection process.

Next, with reference to a flowchart of FIG. 7, an output control process executed by the information processing system 1 will be described.

This process is started, for example, when an instruction for starting an application program accompanied by displaying a video image is inputted to the information processing apparatus 12.

In step S51, the information processing unit 151 starts the application program.

In accordance with this, the depth sensor 101 captures a user image, and starts a process of supplying obtained user image data to the operation body detection unit 122 via the I/F unit 121.

The operation body detection unit 122 starts a process of detecting and tracking a position of a hand of the user U1 in the user image. For example, the operation body detection unit 122 starts detection processing and tracking processing of a fingertip of each finger of the user's hand in the depth image, as shown by a shaded portion in FIG. 8. Furthermore, the operation body detection unit 122 starts a process of supplying the user image data and operation body information including information indicating the position of the hand of the user U1 in the user image, to the operation content recognition unit 123 and the coordinate system setting unit 125.

In step S52, the operation content recognition unit 123 determines whether or not a user operation has been started. Specifically, the operation content recognition unit 123 recognizes a content of the user operation on the basis of the operation body information. The operation content recognition unit 123 determines that the user operation has not been started until a user operation for setting the input coordinate system is recognized.

Whereas, in a case where the operation content recognition unit 123 recognizes the user operation for setting the input coordinate system, the operation content recognition unit 123 determines that the user operation has been started, and the process proceeds to step S53.

FIGS. 9A, 9B, 10A, 10B, 11A, and 11B show examples of the user operation for setting the input coordinate system.

Figure 9A:
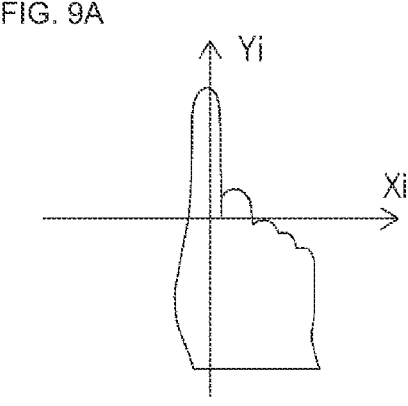
FIGS. 9A and 9B are views showing a first example of a method of setting an input coordinate system.
Figure 9B:
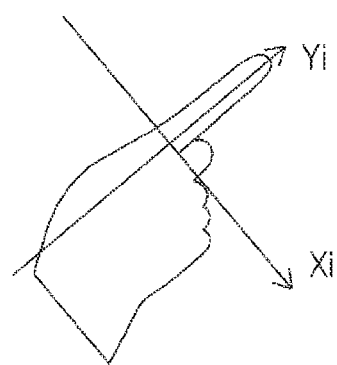

For example, in a case of setting the input coordinate system, the user U1 touches a desired plane (hereinafter, referred to as an input surface) such as the desk 3 or the desk 4 with a hand in a predetermined shape. For example, as shown in FIGS. 9A and 9B, the user U1 touches a desired plane with the index finger extended. Furthermore, for example, as shown in FIGS. 10A and 10B or 11A and 11B, the user U1 touches a desired plane with the hand open.

The operation content recognition unit 123 detects the shape of the hand of the user U1 and the touch of the hand of the user U1 on the input surface, on the basis of three-dimensional information of the hand of the user U1 in the user image and the input surface.

Note that, for an algorithm for detecting the touch of the user's hand, for example, a method described in "R. Xiao, S. Hudson, and C. Harrison, "Supporting responsive cohabitation between virtual interfaces and physical objects on everyday surfaces," HCI, vol. 1, no. 1, p. 12, 2017" or the like is used.

In step S53, the input coordinate system setting unit 143 sets the input coordinate system.

Specifically, the operation content recognition unit 123 notifies the coordinate system setting unit 125 that the user operation for setting the input coordinate system has been performed.

The input coordinate system setting unit 143 recognizes a position and a shape of the hand of the user U1 when the user input for setting the input coordinate system is performed, on the basis of the operation body information. Then, the input coordinate system setting unit 143 sets the input coordinate system on the basis of an orientation of the hand of the user U1, which is the operation body.

For example, in the example of FIGS. 9A and 9B, on an input surface, a point corresponding to the vicinity of a base of the index finger is set as an origin of the input coordinate system. Furthermore, an axis passing through the origin on the input surface and extends in a direction indicated by the index finger is set as a Yi axis of the input coordinate system, and an axis passing through the origin and is orthogonal to the Yi axis on the input surface is set as an Xi axis of the input coordinate system.

For example, in the example of FIGS. 10A and 10B, on an input surface, a point corresponding to a center of a rectangular region defined by the expanded hand is set as the origin of the input coordinate system. Furthermore, an axis passing through the origin on the input surface and is parallel to a direction in which the user's finger extends in the rectangular region is set as the Yi axis of the input coordinate system, and an axis passing through the origin and is orthogonal to the Yi axis on the input surface is set as an Xi axis of the input coordinate system.

For example, in the example of FIGS. 11A and 11B, on an input surface, a point corresponding to a center of the back of the hand is set as the origin of the input coordinate system. Furthermore, an axis passing through the origin and a finger tip of the index finger on the input surface is set as a Yi axis of the input coordinate system, and an axis passing through the origin and is orthogonal to the Yi axis on the input surface is set as an Xi axis of the input coordinate system.

The input coordinate system setting unit 143 supplies information indicating the set input coordinate system, for example, information indicating a position of the input coordinate system in the display space model and the user image, to the operation content recognition unit 123 and the application control unit 126.

In step S54, the operation content recognition unit 123 recognizes a content of the user operation. Specifically, on the basis of a shape and a position of the hand of the user U1 detected by the operation body detection unit 122, the operation content recognition unit 123 recognizes a content of the user operation and a position of the input coordinate system in which the user operation has been performed.

FIG. 12 shows an example of a type of a user operation and an operation method.

In this example, three types of the user operation are exemplified: a user interface (UI) operation, a local movement of a video image, and a spatial movement of a video image.

The UI operation is a user operation for performing various operations on a video image content in a video image. For example, operations such as scrolling, enlarging, and reducing of a video image content, and instructing or selecting a position in a video image content are applicable. For example, the user performs the UI operation by sliding or tapping an input surface with one finger such as an index finger. Furthermore, for example, the user performs the UI operation by pinching in or out of the input surface with two fingers such as a thumb and an index finger.

The local movement of a video image is, for example, a user operation for moving a display position of the video image within a predetermined narrow range of the same input surface. For example, the user performs the local movement of the video image by sliding three fingers such as an index finger, a middle finger, and a ring finger, on the input surface.

The spatial movement of a video image is, for example, a user operation for moving a display position of the video image in a predetermined range or more within the same input surface, or moving a video image to a different display surface. For example, the user performs spatial movement of the video image by sliding five fingers or the entire palm on the input surface.

The operation content recognition unit 123 supplies information indicating a content of the user operation to the coordinate system setting unit 125, and supplies user operation information including the content and a position of the user operation to the application control unit 126.

In step S55, the information processing unit 151 determines whether or not termination of the application program has been instructed. For example, in a case where a user operation for instructing termination of the application program is not recognized, the information processing unit 151 determines that termination of the application program has not been instructed, and the process proceeds to step S56.

In step S56, the input coordinate system setting unit 143 determines whether or not the input coordinate system needs to be changed, on the basis of the content of the user operation and a display position or the like of the video image set in step S59 described later. For example, in a case where the user operation changes from the UI operation or the local movement of the video image to the spatial movement of the video image, or changes from the spatial movement of the video image to the UI operation or the local movement of the video image, the input coordinate system setting unit 143 determines that the input coordinate system needs to be changed. Furthermore, for example, the input coordinate system setting unit 143 determines that the input coordinate system needs to be changed in a case where the user operation for setting the input coordinate system is performed. Moreover, for example, in a case where a display surface on which the video image is displayed is changed in accordance with a movement of the display position of the video image, the input coordinate system setting unit 143 determines that the input coordinate system needs to be changed. Then, in a case where it is determined that the input coordinate system needs to be changed, the process proceeds to step S57.

In step S57, the input coordinate system setting unit 143 changes the input coordinate system. The input coordinate system setting unit 143 supplies information indicating the input coordinate system after the change, for example, information indicating a position of the input coordinate system in the display space model and the user image, to the operation content recognition unit 123 and the application control unit 126.

Note that a method of changing the input coordinate system will be described later.

Thereafter, the process proceeds to step S58.

Whereas, in a case where it is determined in step S56 that the input coordinate system does not need to be changed, the process of step S57 is skipped, and the process proceeds to step S58.

In step S58, the application control unit 126 sets an output content. Specifically, on the basis of a content and a position of the user operation set by the input coordinate system setting unit 143, a result of information processing by the information processing unit 151, and the like, the video image control unit 152 sets a video image content in a video image outputted from the drive-type display device 13.

Furthermore, on the basis of a content and a position of the user operation, a result of information processing by the information processing unit 151, and the like, the sound control unit 153 sets a sound content, which is a content of sound outputted from the drive-type display device 13. The sound control unit 153 supplies sound information including information indicating the sound content, to the output control unit 127.

In step S59, the video image control unit 152 sets a display position of the video image. Specifically, the video image control unit 152 sets a display position of the video image in the spatial coordinate system, on the basis of a content, a position, and the like of the user operation in the input coordinate system set by the input coordinate system setting unit 143. The video image control unit 152 supplies video image information including a video image content and information indicating the display position, to the output control unit 127.

Furthermore, the UI coordinate system setting unit 142 sets a UI coordinate system on the basis of the display position of the video image set by the video image control unit 152 and the display space model. The UI coordinate system setting unit 142 supplies information indicating the set UI coordinate system, for example, information indicating a position of the UI coordinate system in the display space model, to the application control unit 126.

In step S60, the information processing system 1 outputs a video image and sound. Specifically, the video image generation unit 161 generates video image data for displaying a video image including the set video image content at the set display position. At this time, geometric correction of the video image is performed on the basis of a positional relationship between the projector 181 and the display surface, a shape of the display surface, and the like. The video image generation unit 161 supplies the generated video image data to the drive-type display device 13 via the I/F unit 121.

The drive control unit 162 controls the drive mechanism 184 of the drive-type display device 13 via the I/F unit 121 such that a video image is displayed at the set display position.

The projector 181 projects a video image based on video image data received from the video image generation unit 161, onto the display surface.

The sound generation unit 163 generates sound data for outputting sound including the set sound content. The sound generation unit 163 supplies the generated sound data to the drive-type display device 13 via the I/F unit 121.

The speaker 182 outputs sound based on the sound data received from the sound generation unit 163.

Thereafter, the process returns to step S54, and the processes of steps S54 to S60 are repeatedly executed until it is determined in step S55 that termination of the application program is instructed.

Whereas, in step S55, in a case where a user operation for instructing termination of the application program is recognized, for example, the information processing unit 151 determines that termination of the application program has been instructed, and the process proceeds to step S61.

In step S61, the information processing unit 151 terminates the application program.

Thereafter, the output control process is terminated.

<Specific Example of Coordinate System and Display Position of Video Image>

Next, with reference to FIGS. 13 to 37, a specific example of a coordinate system and a display position of a video image in the output control process of FIG. 7 will be described.

First Example

First, a first example will be described with reference to FIGS. 13 to 15.

Figure 13:
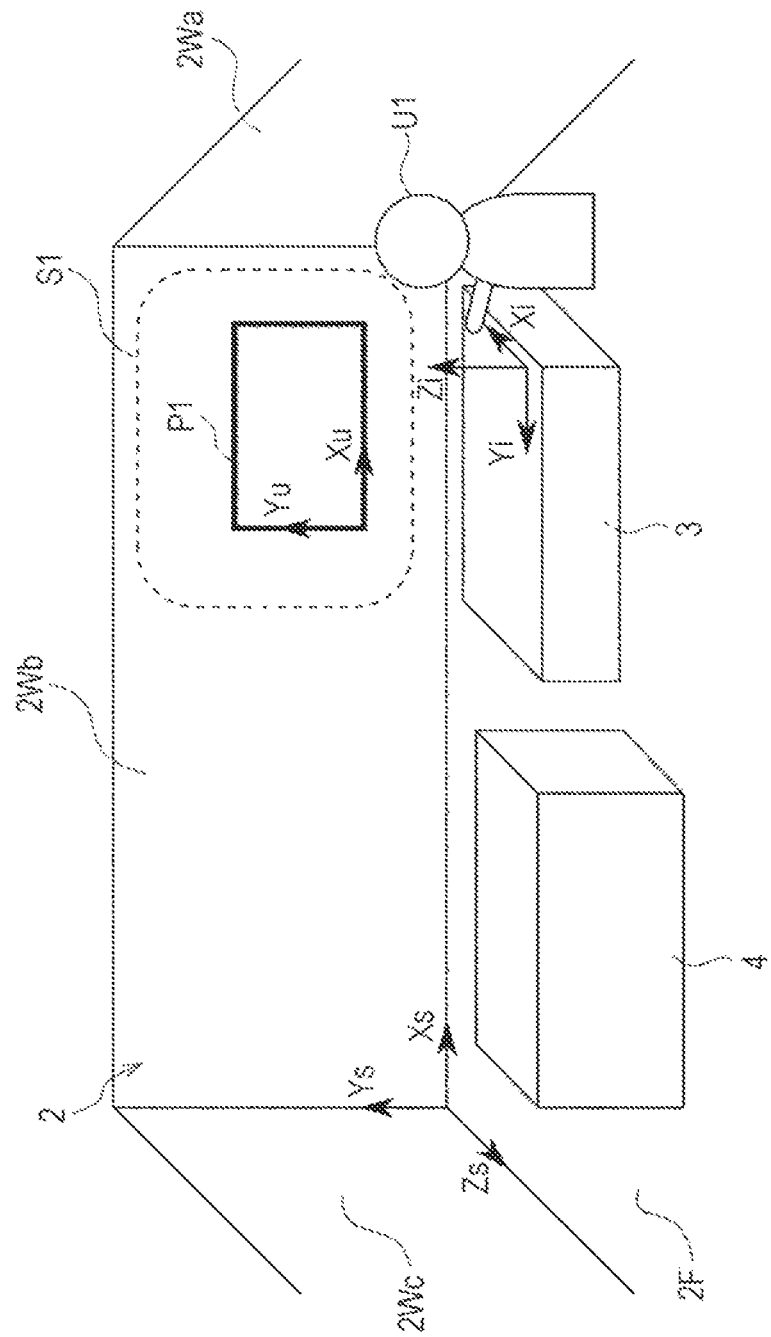
FIG. 13 is a view showing a first example of a coordinate system and a display position of a video image.

In the example of FIG. 13, a spatial coordinate system is set similarly to the example of FIG. 6.

Furthermore, the user U1 faces a direction of the wall 2Wc, and an upper surface of the desk 3 is set as an input surface. Then, an Xi axis of the input coordinate system is set on the upper surface of the desk 3, in a direction parallel to and opposite to the Zs axis of the spatial coordinate system. A Yi axis is set on the upper surface of the desk 3, in a direction parallel to and opposite to the Xs axis of the spatial coordinate system. A Zi axis is set in a direction perpendicular to the upper surface of the desk 3, that is, in a direction parallel to and in the same direction as the Ys axis of the spatial coordinate system.

Moreover, the wall 2Wb on the right of the user U1 is set as a display surface, and a video image P1 is displayed on the wall 2Wb. Furthermore, the video image P1 is displayed such that each side is parallel to each side of the wall 2Wb. Therefore, an Xu axis of a UI coordinate system is set parallel to and in the same direction as the Xs axis of the spatial coordinate system, and a Yu axis is set parallel to and in the same direction as the Ys axis of the spatial coordinate system.

In a case where a UI operation is performed in this state, the Xi axis of the input coordinate system and the Xu axis of the UI coordinate system are associated with each other, while the Yi axis of the input coordinate system and the Yu axis of the UI coordinate system are associated with each other. As a result, for example, a movement of a hand of the user U1 in the Xi-axis direction is reflected in a movement of a video image content in the video image P1 in the Xu-axis direction, while a movement of a hand of the user U1 in the Yi-axis direction is reflected in a movement of the video image content in the video image P1 in the Yu-axis direction. For example, the video image content in the video image P1 scrolls in the Xu-axis direction and the Yu-axis direction in accordance with a movement of a hand of the user U1 in the Xi-axis direction and the Yi-axis direction.

Figure 14:
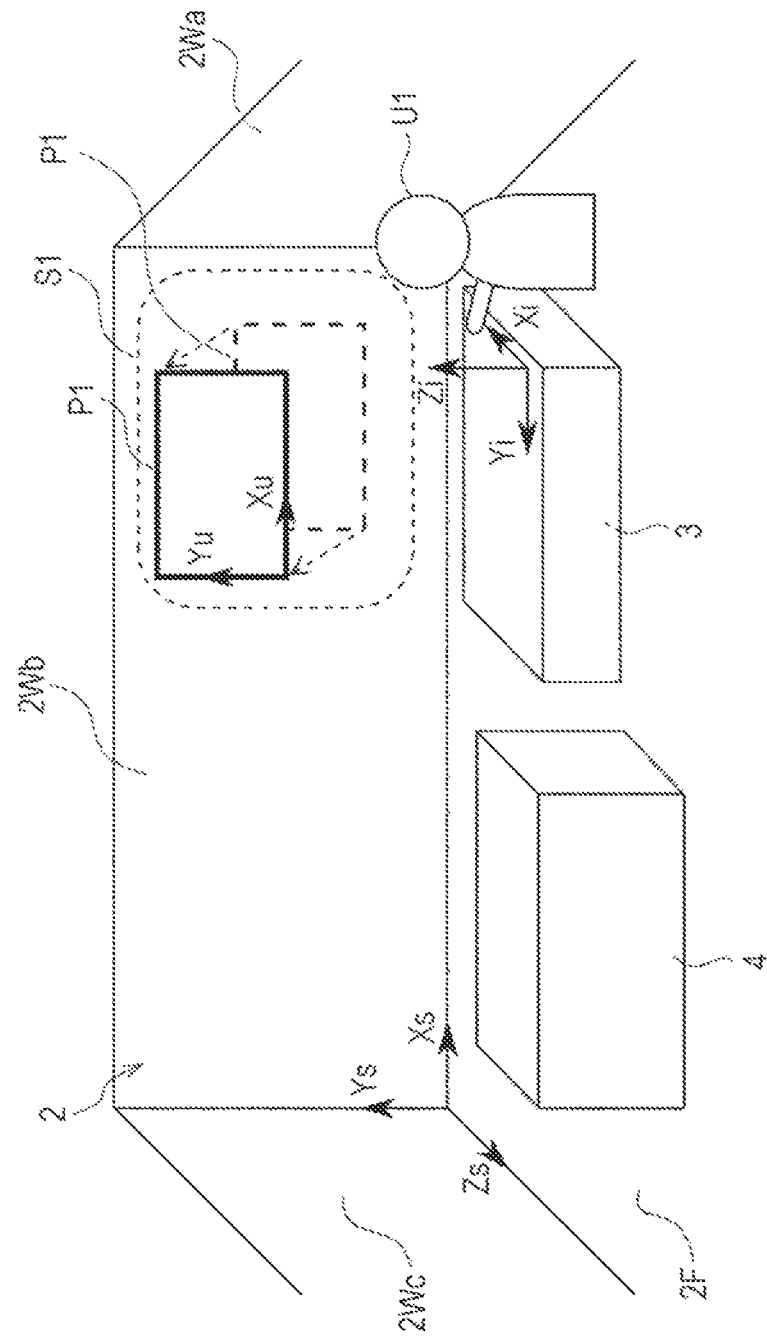
FIG. 14 is a view showing the first example of the coordinate system and the display position of the video image.

FIG. 14 shows an example of a case where a local movement of the video image P1 is performed within a predetermined range S1 in a state similar to that in FIG. 13.

In this case as well, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other, similarly to the case where the UI operation is performed. As a result, for example, a movement of a hand of the user U1 in the Xi-axis direction is reflected in a movement of a display position of the video image P1 in the Xu-axis direction, while a movement of a hand of the user U1 in the Yi-axis direction is reflected in a movement of the display position of the video image P1 in the Yu-axis direction. For example, the display position of the video image P1 moves in the Xu-axis direction and the Yu-axis direction on the wall 2Wb in accordance with a movement of a hand of the user U1 in the Xi-axis direction and the Yi-axis direction. In this example, an example is shown in which the display position of the video image P1 moves diagonally on the wall 2Wb in a negative direction of the Xu axis and in a positive direction of the Yu axis, by the user U1 moving a hand in a negative direction of the Xi axis and in a positive direction of the Yi axis.

Figure 15:
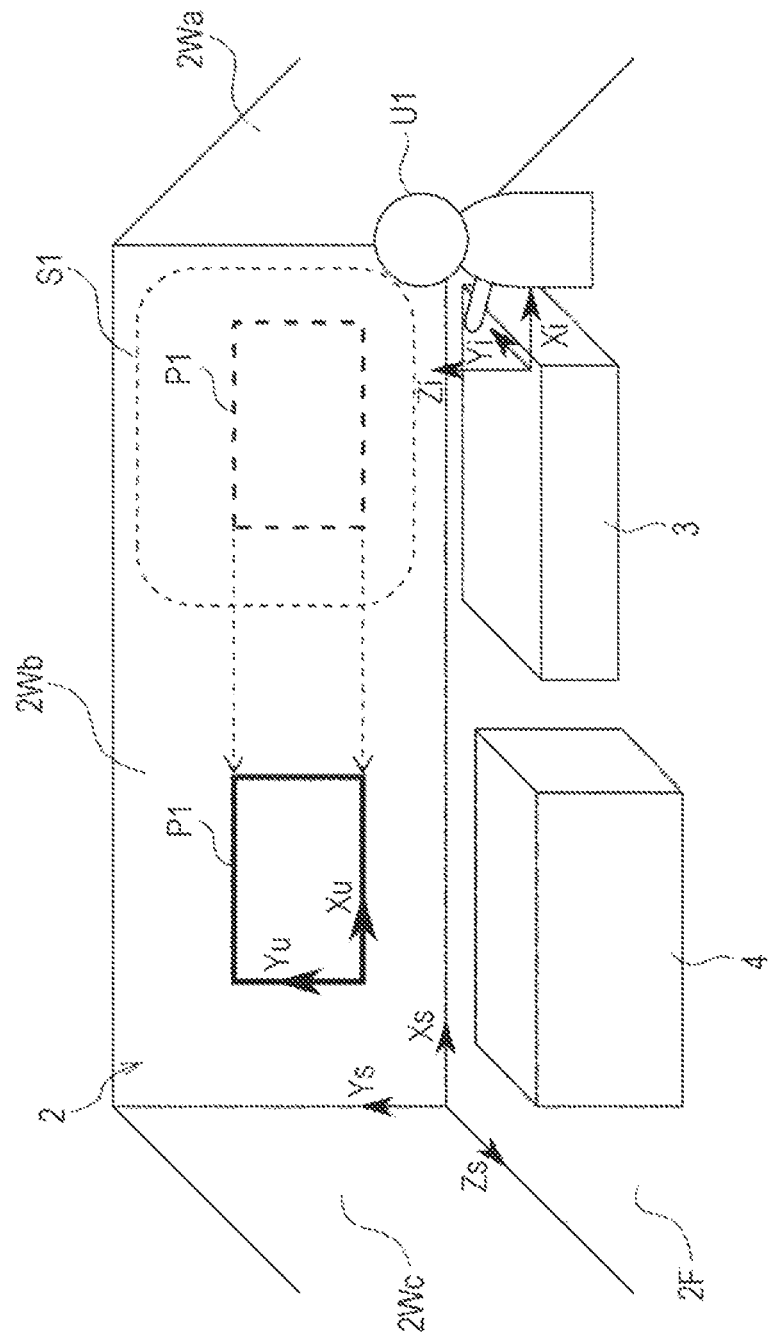
FIG. 15 is a view showing the first example of the coordinate system and the display position of the video image.

FIG. 15 shows an example of a case where a spatial movement of the video image P1 is performed in a state similar to that in FIG. 13.

In this case, the input coordinate system is changed in accordance with the display surface (spatial coordinate system). Specifically, while the input surface and a position of the origin of the input coordinate system remain the same (the input coordinate system and the origin are common), the Xi axis of the input coordinate system is set parallel to and in the same direction as the Xs axis of the spatial coordinate system, on the upper surface of the desk 3. The Yi axis is set on the upper surface of the desk 3, in a direction parallel to and opposite to the Zs axis of the spatial coordinate system. The Zi axis is set in a direction perpendicular to the upper surface of the desk 3, that is, in a direction parallel to and in the same direction as the Ys axis of the spatial coordinate system.

Then, the Xi axis of the input coordinate system and the Xs axis of the spatial coordinate system are associated with each other, while the Yi axis of the input coordinate system and the Ys axis of the spatial coordinate system are associated with each other. As a result, for example, a movement of a hand of the user U1 in the Xi-axis direction is reflected in a movement of a display position of the video image P1 in the Xs-axis direction, while a movement of a hand of the user U1 in the Yi-axis direction is reflected in a movement of the display position of the video image P1 in the Ys-axis direction. For example, the display position of the video image P1 moves in the Xs-axis direction and the Ys-axis direction on the wall 2Wb in accordance with a movement of a hand of the user U1 in the Xi-axis direction and the Yi-axis direction. In this example, an example is shown in which the display position of the video image P1 moves in a negative direction of the Xs axis on the wall 2Wb, by the user U1 moving a hand in a negative direction of the Xi axis.

In this way, in a case where the input surface (for example, the upper surface of the desk 3) on which the user operation is performed and the display surface (for example, the wall 2Wb) on which the video image P1 is displayed are perpendicular to each other, the axis (Xi axis) of the input coordinate system and the axis (Xs axis) of the spatial coordinate system, which are both parallel to the display surface, are associated with each other. Therefore, a movement of a hand of the user U1 in the Xi-axis direction coincides with a movement direction of the video image P1 on the display surface, and the video image P1 moves in the same direction in accordance with the movement of the hand of the user U1 in the Xi-axis direction. As a result, the user U1 can easily grasp the correspondence between the movement of the hand and the movement of the display position of the video image P1, and the operability is improved.

Note that, in a case where the user operation is switched from the spatial movement of the video image P1 to the UI operation or the local movement of the video image P1, the input coordinate system and the correspondence between the input coordinate system and the spatial coordinate system are changed from the state of FIG. 15 to the state of FIG. 13 or FIG. 14.

Second Example

Next, a second example will be described with reference to FIGS. 16 to 19.

Figure 16:
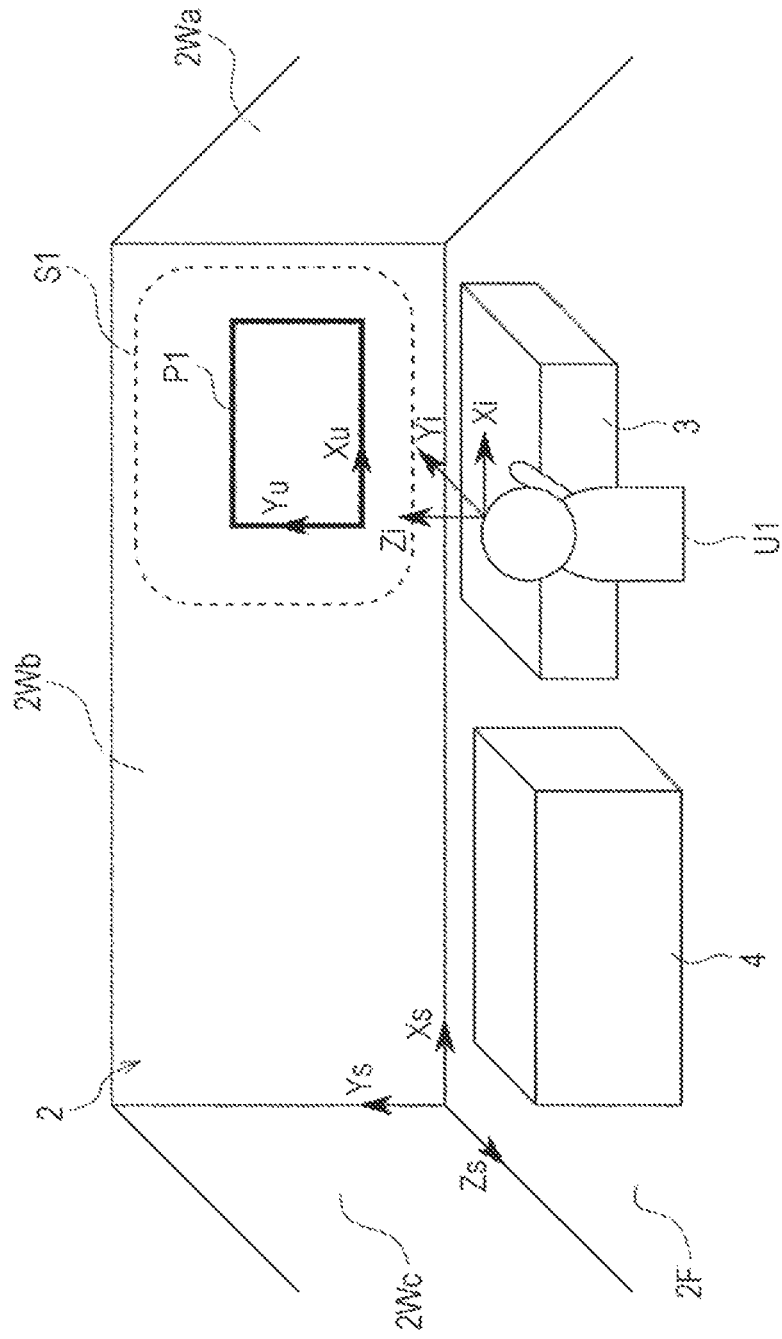
FIG. 16 is a view showing a second example of the coordinate system and the display position of the video image.

In the example of FIG. 16, a spatial coordinate system is set similarly to the example of FIG. 13. Furthermore, a video image P1 is displayed similarly to the example of FIG. 13, and a UI coordinate system is set similarly to the example of FIG. 13. Whereas, unlike the example of FIG. 13, a user U1 faces a direction of the wall 2Wb, and an input coordinate system is set similarly to the example of FIG. 15.

In a case where a UI operation is performed in this state, similarly to the example in FIG. 13, an Xi axis of the input coordinate system and an Xu axis of the UI coordinate system are associated with each other, while a Yi axis of the input coordinate system and a Yu axis of the UI coordinate system are associated with each other. Therefore, with respect to a movement of a hand of the user U1 in the input coordinate system, a video image content in the video image P1 moves similarly to the example of FIG. 13. However, since an orientation of the input coordinate system is different from that of the example of FIG. 13, a direction in which the user U1 moves the hand when operating the video image content in the video image P1 is different.

Figure 17:
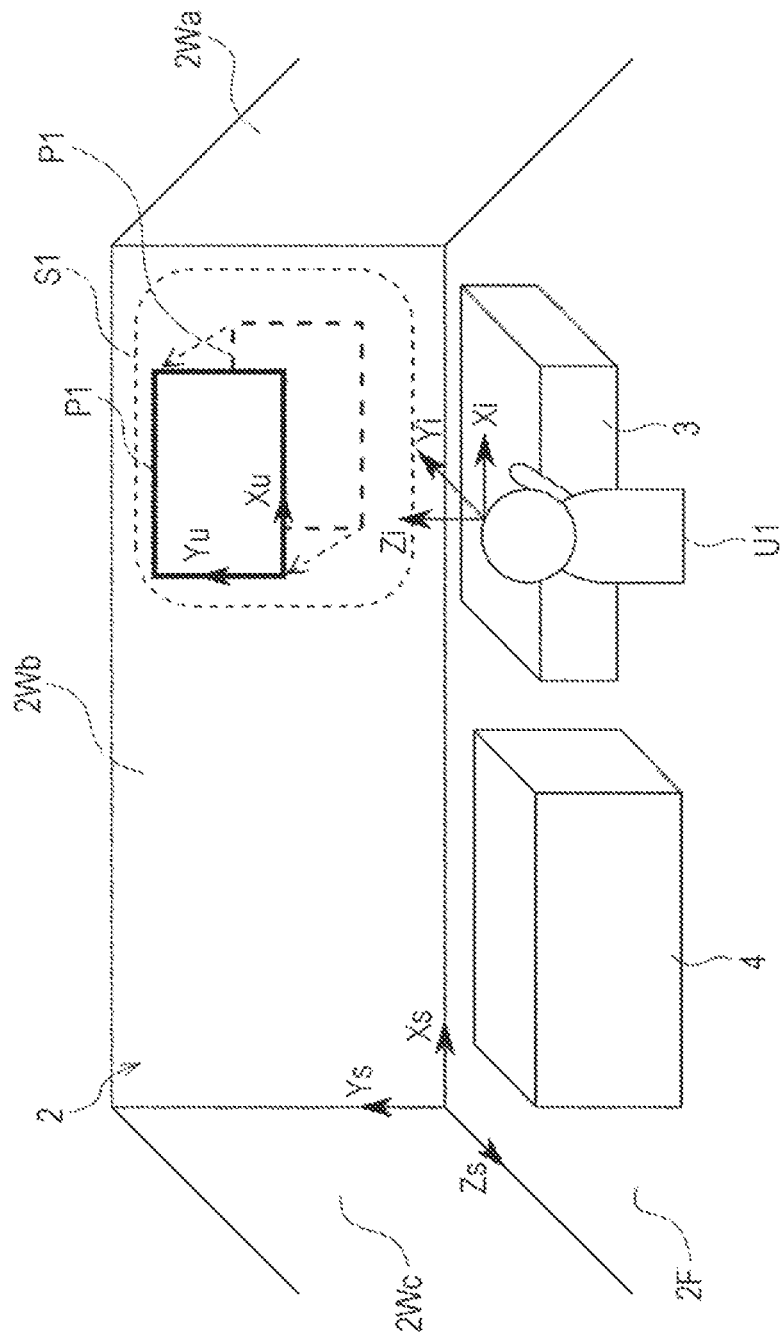
FIG. 17 is a view showing the second example of the coordinate system and the display position of the video image.

FIG. 17 shows an example of a case where a local movement of the video image P1 is performed in a state similar to that in FIG. 16.

In this case as well, similarly to the example of FIG. 14, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. Therefore, with respect to a movement of a hand of the user U1 in the input coordinate system, a display position of the video image P1 moves similarly to the example of FIG. 14. However, since an orientation of the input coordinate system is different from that of the example of FIG. 14, a direction in which the user U1 moves the hand for the local movement of the video image P1 is different.

Figure 18:
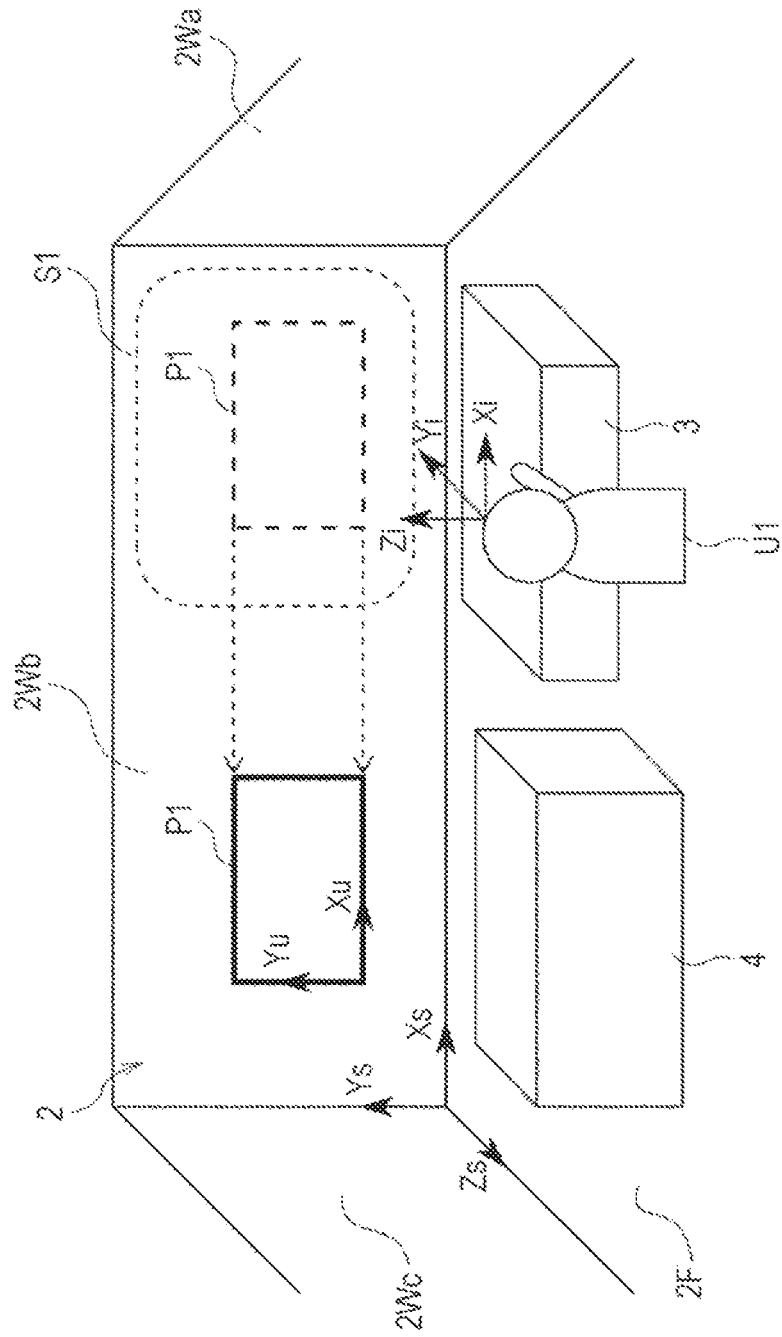
FIG. 18 is a view showing the second example of the coordinate system and the display position of the video image.

FIG. 18 shows an example of a case where a spatial movement of the video image P1 is performed in a state similar to that in FIG. 16.

In this case, since the Xi axis of the input coordinate system and the Xs axis of the spatial coordinate system are originally set to be parallel and in the same direction, the input coordinate system is not changed. Then, similarly to the example of FIG. 15, the Xi axis of the input coordinate system and the Xs axis of the spatial coordinate system are associated with each other, while the Yi axis of the input coordinate system and the Ys axis of the spatial coordinate system are associated with each other. Therefore, since an orientation of the input coordinate system is the same as that of the example of FIG. 15, the display position of the video image P1 can be moved by a hand movement similar to that of the example of FIG. 15.

FIG. 19 shows an example of a case of a spatial movement of the video image P1 from the wall 2Wb to the wall 2Wc.

In this case, after the video image P1 moves from the wall 2Wb to the wall 2Wc, the input coordinate system is changed in accordance with the display surface (spatial coordinate system) as the display surface is changed. Specifically, while the input surface and a position of the origin of the input coordinate system remain the same, the Zi axis of the input coordinate system is set parallel to and in the same direction as the Zs axis of the spatial coordinate system, on the upper surface of the desk 3. The Yi axis of the input coordinate system is set on the upper surface of the desk 3, in a direction parallel to and opposite to the Xs axis of the spatial coordinate system. The Xi axis of the input coordinate system is set in a direction perpendicular to the upper surface of the desk 3, that is, parallel to and in the same direction as the Ys axis of the spatial coordinate system.

Then, the Zi axis of the input coordinate system and the Zs axis of the spatial coordinate system are associated with each other, while the Yi axis of the input coordinate system and the Ys axis of the spatial coordinate system are associated with each other. As a result, for example, a movement of a hand of the user U1 in the Zi-axis direction is reflected in a movement of a display position of the video image P1 in the Zs-axis direction, while a movement of a hand of the user U1 in the Yi-axis direction is reflected in a movement of the display position of the video image P1 in the Ys-axis direction. For example, the display position of the video image P1 moves in the Zs-axis direction and the Ys-axis direction on the wall 2Wc in accordance with a movement of a hand of the user U1 in the Zi-axis direction and the Yi-axis direction. In the example of B of FIG. 19, an example is shown in which the display position of the video image P1 moves in a positive direction of the Zs axis on the wall 2Wc, by the user U1 moving a hand in a positive direction of the Zi axis.

In this way, the input coordinate system is changed in accordance with the movement of the display surface of the video image P1, and the axis (Zi axis) of the input coordinate system and the axis (Zs axis) of the spatial coordinate system, which are both parallel to the display surface, are associated with each other. Therefore, a movement of a hand of the user U1 in the Zi-axis direction coincides with a movement direction of the video image P1 on the display surface, and the video image P1 moves in the same direction in accordance with the movement of the hand of the user U1 in the Zi-axis direction. As a result, even if the display surface of the video image P1 is changed, the user U1 can easily grasp the correspondence between the movement of the hand and the movement of the display position of the video image P1, and the operability is improved. Furthermore, the user U1 can move the video image P1 to a different display surface, only by operating on the input surface without touching the display surface.

Note that, for example, in a case where the display surface of video image P1 moves, the input coordinate system may be changed immediately after the movement, or the input coordinate system may be changed after the spatial movement of the video image P1 is stopped (for example, after the spatial movement operation is completed), without a change of the input coordinate system while the spatial movement of video image P1 continues.

Furthermore, for example, by an operation such as flicking, the video image P1 may continue to move even after the user U1 releases the hand from the input surface, and the movement of the video image P1 may be stopped after the movement of the display surface of the video image P1. In this case, the input coordinate system is changed after the movement of the video image P1 is stopped.

Note that, in a case where the user operation is switched from the spatial movement of the video image P1 to the UI operation or the local movement of the video image P1, the input coordinate system and the correspondence between the input coordinate system and the spatial coordinate system are changed from the state of FIG. 18 or FIG. 19 to the state of FIG. 16 or FIG. 17.

Third Example

Next, a third example will be described with reference to FIGS. 20 to 22.

Figure 20:
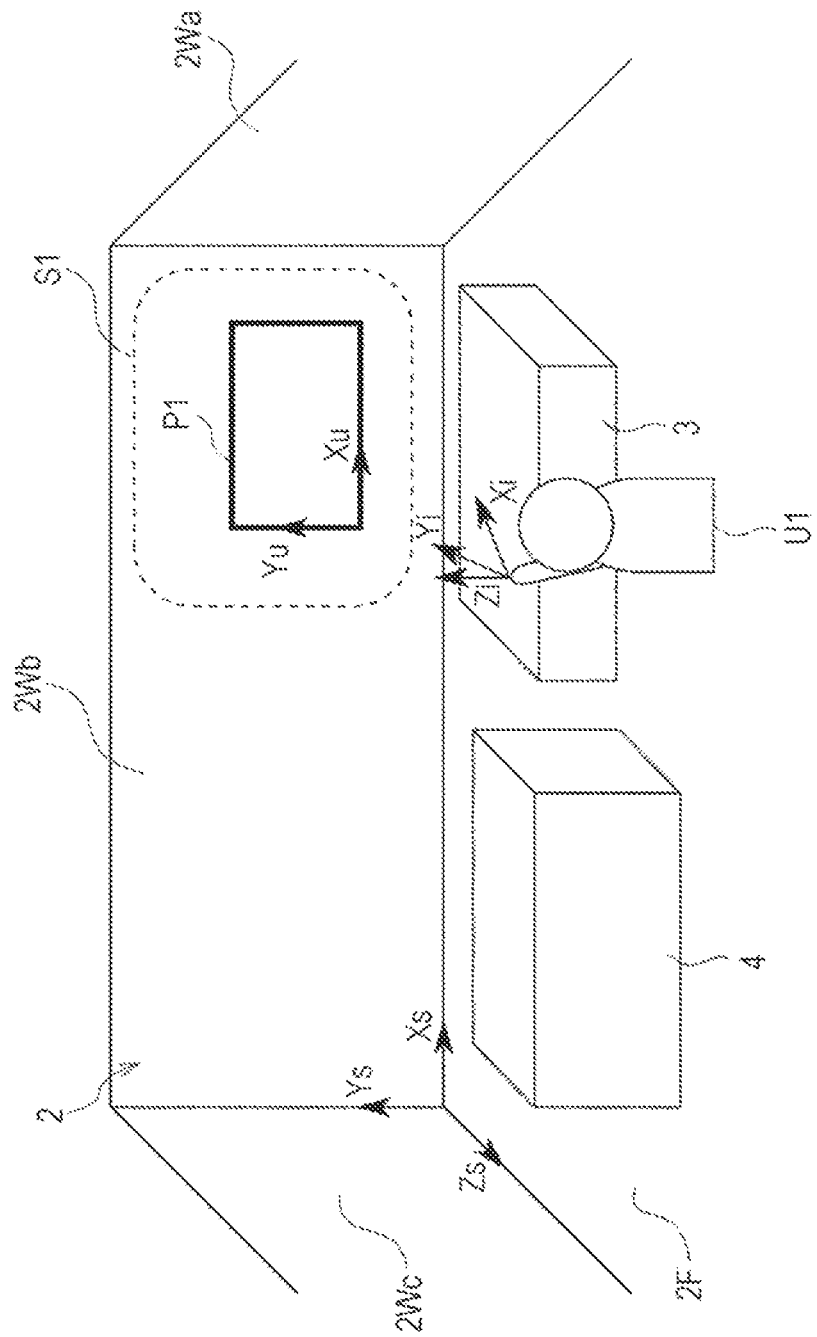
FIG. 20 is a view showing a third example of the coordinate system and the display position of the video image.

In the example of FIG. 20, a spatial coordinate system is set similarly to the example of FIG. 13. Furthermore, a video image P1 is displayed similarly to the example of FIG. 13, and a UI coordinate system is set similarly to the example of FIG. 13.

Whereas, unlike the example of FIG. 13, an input coordinate system is tilted with respect to the spatial coordinate system. Specifically, the upper surface of the desk 3 is set as an input surface. Then, an Xi axis of the input coordinate system is set to be tilted with respect to the Xs axis and the Zs axis of the spatial coordinate system, on the upper surface of the desk 3. A Yi axis is set to be perpendicular to the Xi axis on the upper surface of the desk 3 and to be tilted with respect to the Xs axis and the Zs axis of the spatial coordinate system. A Zi axis is set in a direction perpendicular to the upper surface of the desk 3, that is, in a direction parallel to and in the same direction as the Ys axis of the spatial coordinate system.

In a case where a UI operation is performed in this state, similarly to the example in FIG. 13, the Xi axis of the input coordinate system and an Xu axis of the UI coordinate system are associated with each other, while the Yi axis of the input coordinate system and a Yu axis of the UI coordinate system are associated with each other. Therefore, with respect to a movement of a hand of the user U1 in the input coordinate system, a video image content in the video image P1 moves similarly to the example of FIG. 13. However, since an orientation of the input coordinate system is different from that of the example of FIG. 13, a direction in which the user U1 moves the hand when operating the video image content in the video image P1 is different.

Figure 21:
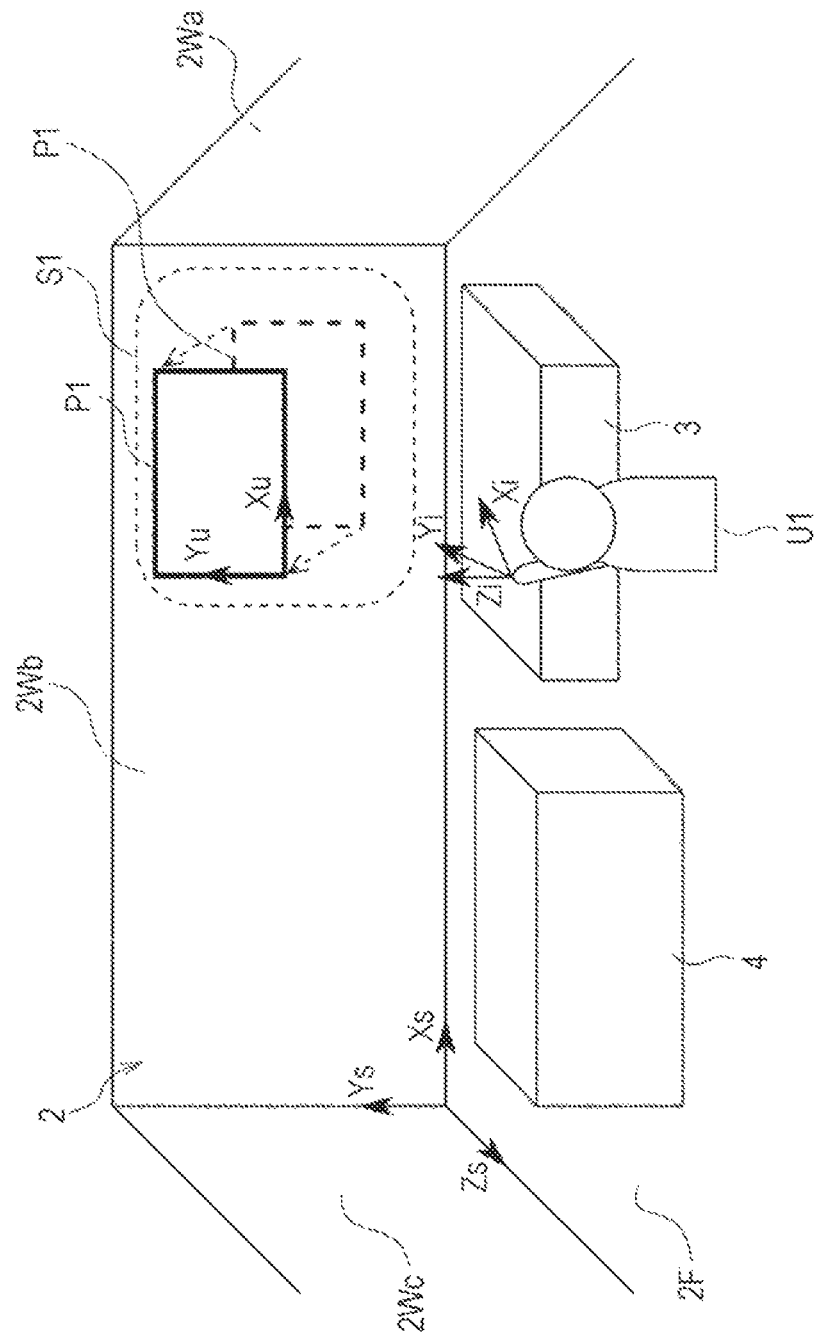
FIG. 21 is a view showing the third example of the coordinate system and the display position of the video image.

FIG. 21 shows an example of a case where a local movement of the video image P1 is performed in a state similar to that in FIG. 20.

In this case as well, similarly to the example of FIG. 14, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. Therefore, with respect to a movement of a hand of the user U1 in the input coordinate system, a display position of the video image P1 moves similarly to the example of FIG. 14. However, since an orientation of the input coordinate system is different from that of the example of FIG. 14, a direction in which the user U1 moves the hand for the local movement of the video image P1 is different.

Figure 22:
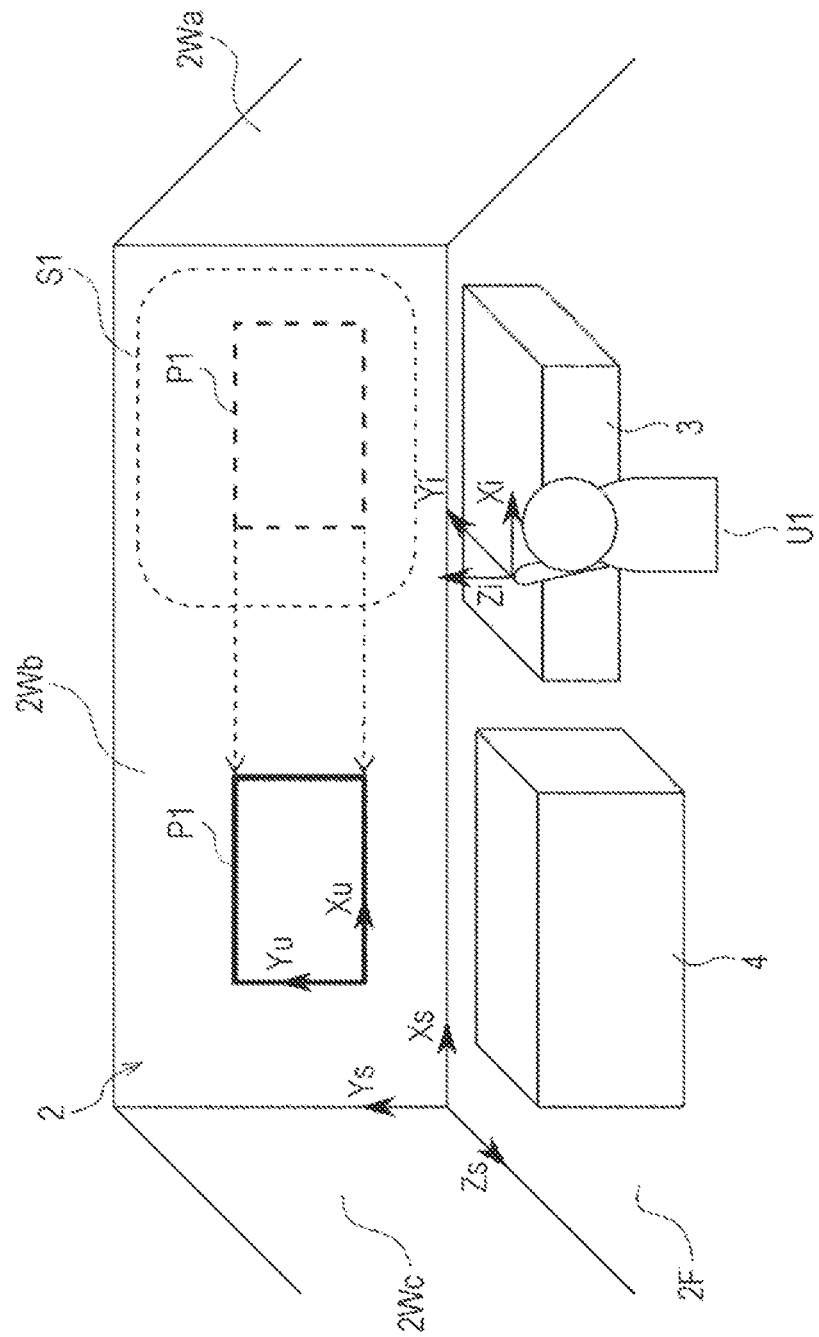
FIG. 22 is a view showing the third example of the coordinate system and the display position of the video image.

FIG. 22 shows an example of a case where a spatial movement of the video image P1 is performed in a state similar to that in FIG. 20.

In this case, similarly to the example of FIG. 15, the input coordinate system is changed in accordance with the spatial coordinate system. As a result, the Xi axis of the input coordinate system becomes parallel to the wall 2Wb, which is the display surface. Then, the display position of the video image P1 can be moved by a hand movement similar to that of the example of FIG. 15.

In this way, in a case where the input surface and the display surface are perpendicular to each other and the axis of the input coordinate system is tilted with respect to the display surface, the input coordinate system is changed such that one axis (for example, the Xi axis) of the input coordinate system is parallel to the display surface when a spatial movement of the video image P1 is performed. Then, the axis (Xi axis) of the input coordinate system and the axis (Xs axis) of the spatial coordinate system, which are both parallel to the display surface, are associated with each other. Therefore, a movement of a hand of the user U1 in the Xi-axis direction coincides with a movement direction of the video image P1 on the display surface, and the video image P1 moves in the same direction in accordance with the movement of the hand of the user U1 in the Xi-axis direction. As a result, the user U1 can easily grasp the correspondence between the movement of the hand and the movement of the display position of the video image P1, and the operability is improved.

Note that, in a case where the user operation is switched from the spatial movement of the video image P1 to the UI operation or the local movement of the video image P1, the input coordinate system and the correspondence between the input coordinate system and the spatial coordinate system are changed from the state of FIG. 22 to the state of FIG. 20 or FIG. 21.

Fourth Example

Next, a fourth example will be described with reference to FIGS. 23 to 25.

Figure 23:
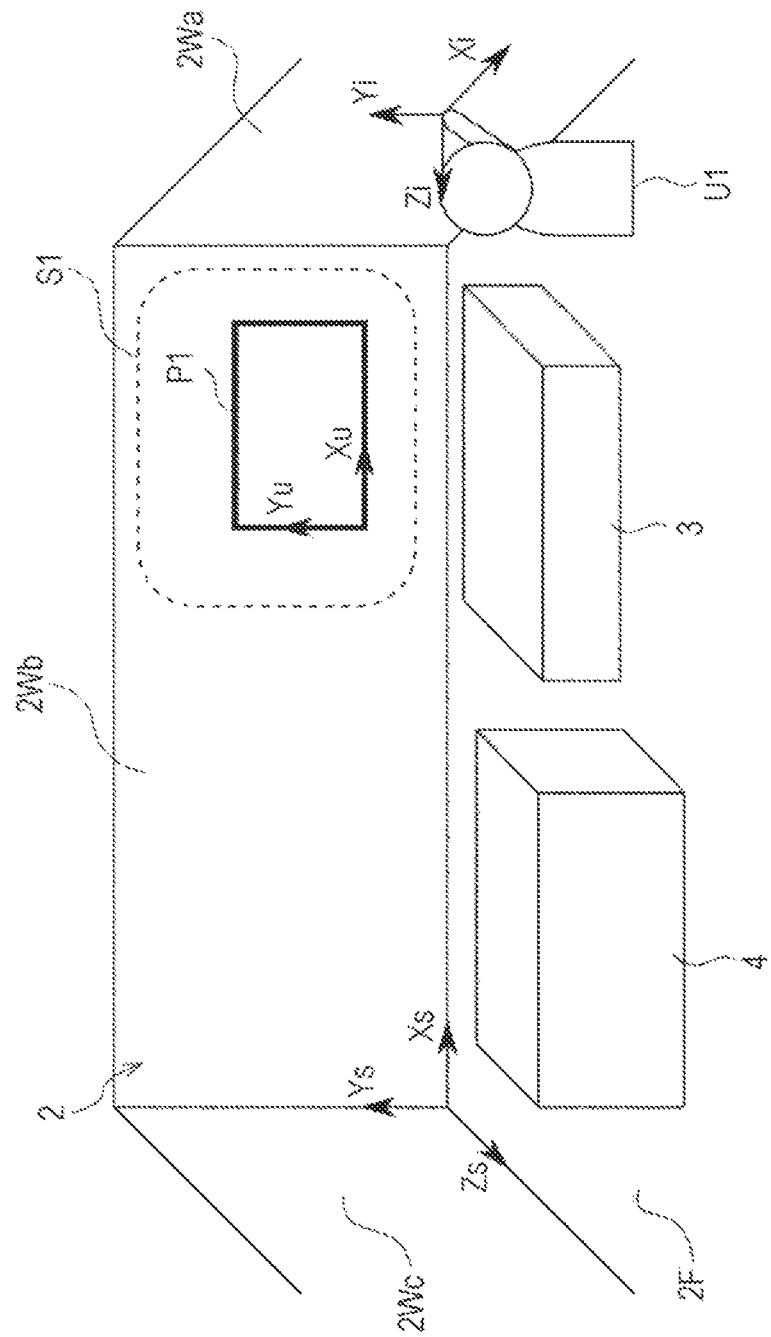
FIG. 23 is a view showing a fourth example of the coordinate system and the display position of the video image.

In the example of FIG. 23, a spatial coordinate system is set similarly to the example of FIG. 13. Furthermore, a video image P1 is displayed similarly to the example of FIG. 13, and a UI coordinate system is set similarly to the example of FIG. 13.

Whereas, an input coordinate system is different from that of the example of FIG. 13. Specifically, the wall 2Wa is set as an input surface. Then, an Xi axis of the input coordinate system is set parallel to and in the same direction as the Zs axis of the spatial coordinate system, on the wall 2Wa. A Yi axis is set parallel to and in the same direction as the Ys axis of the spatial coordinate system. A Zi axis is set in a direction perpendicular to the wall 2Wa, that is, in a direction parallel to and opposite to the Xs axis of the spatial coordinate system.

In a case where a UI operation is performed in this state, similarly to the example in FIG. 13, an Xi axis of the input coordinate system and an Xu axis of the UI coordinate system are associated with each other, while a Yi axis of the input coordinate system and a Yu axis of the UI coordinate system are associated with each other. Therefore, with respect to a movement of a hand of the user U1 in the input coordinate system, a video image content in the video image P1 moves similarly to the example of FIG. 13. However, since the input surface and an orientation of the input coordinate system are different from those of the example of FIG. 13, a direction in which the user U1 moves the hand when operating the video image content in the video image P1 is different.

Figure 24:
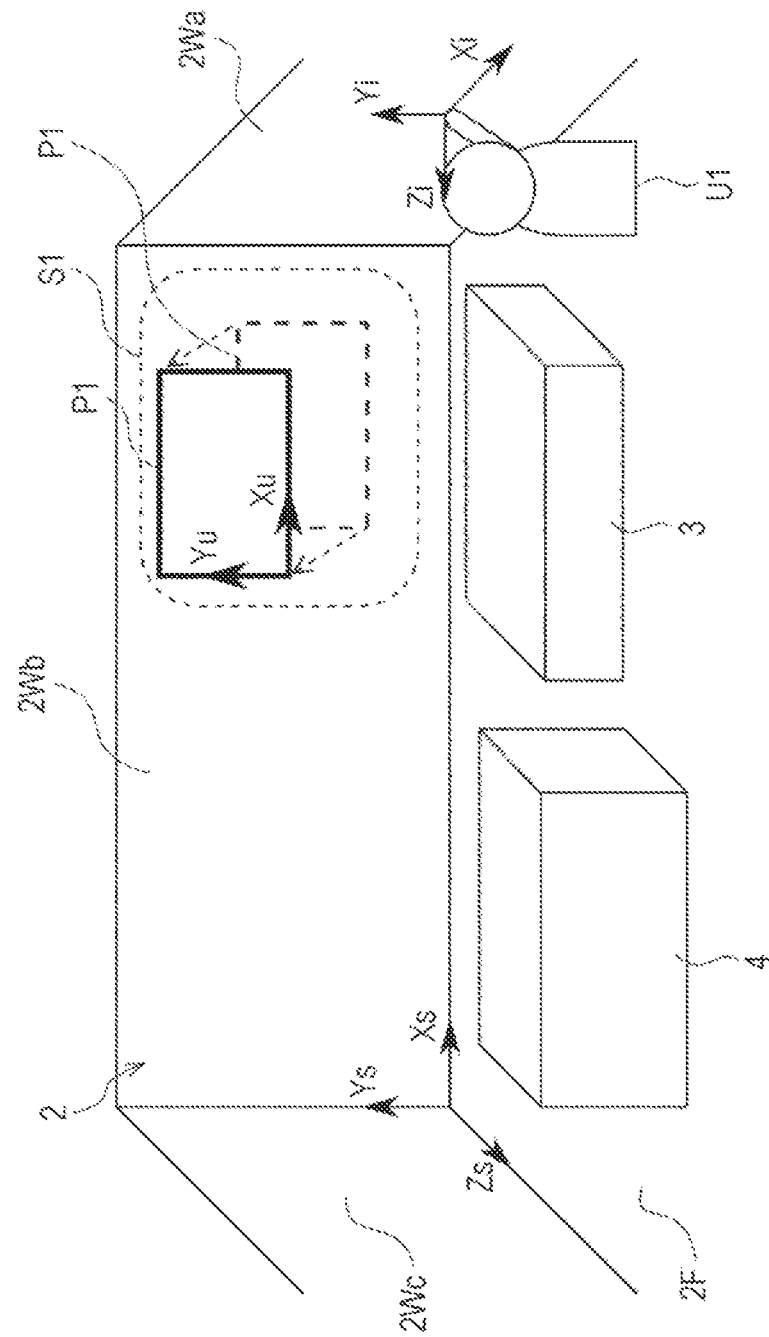
FIG. 24 is a view showing the fourth example of the coordinate system and the display position of the video image.

FIG. 24 shows an example of a case where a local movement of the video image P1 is performed in a state similar to that in FIG. 23.

In this case as well, similarly to the example of FIG. 14, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. Therefore, with respect to a movement of a hand of the user U1 in the input coordinate system, a display position of the video image P1 moves similarly to the example of FIG. 14. However, since the input surface and an orientation of the input coordinate system are different from those of the example of FIG. 14, a direction in which the user U1 moves the hand for the local movement of the video image P1 is different.

Figure 25:
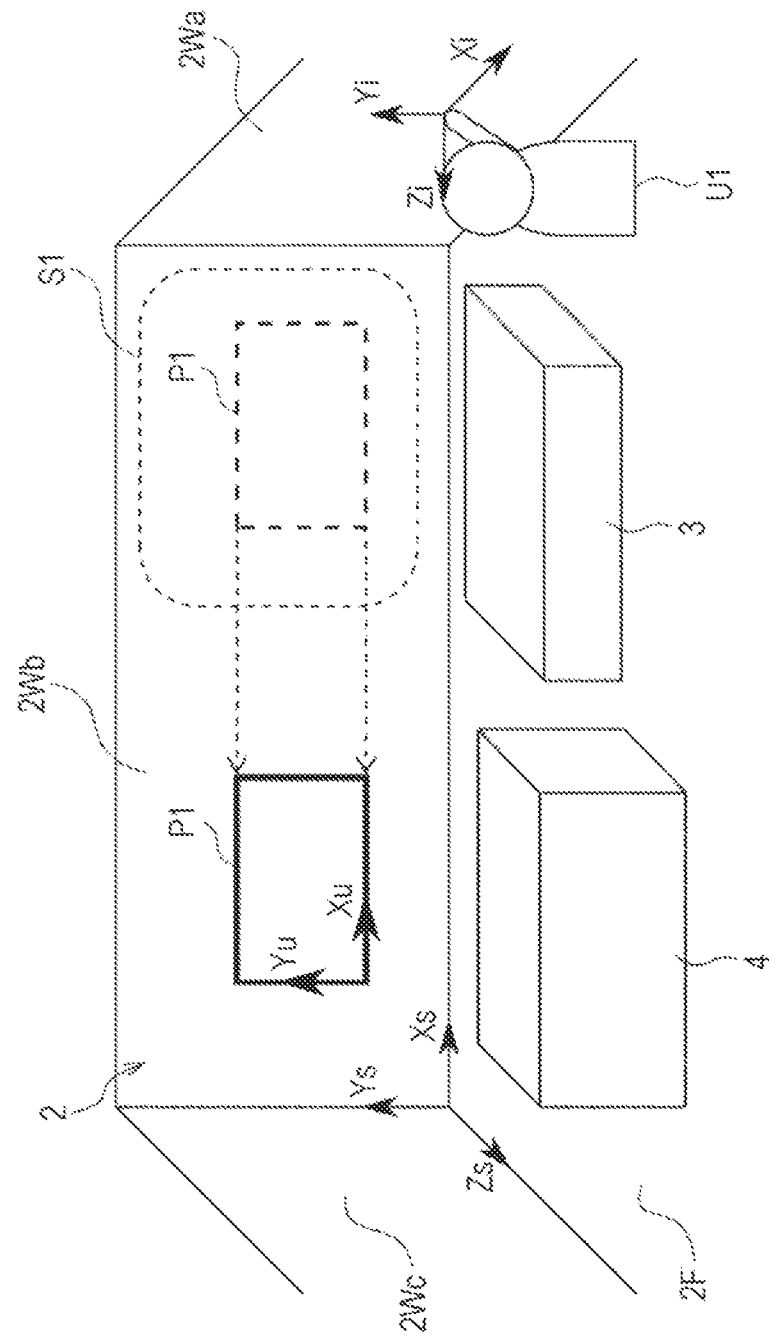
FIG. 25 is a view showing the fourth example of the coordinate system and the display position of the video image.

FIG. 25 shows an example of a case where a spatial movement of the video image P1 is performed in a state similar to that in FIG. 21.

In this case, since the Yi axis of the input coordinate system and the Ys axis of the spatial coordinate system are originally set to be parallel and in the same direction, the input coordinate system is not changed. Then, similarly to the example of FIG. 15, the Xi axis of the input coordinate system and the Xs axis of the spatial coordinate system are associated with each other, while the Yi axis of the input coordinate system and the Ys axis of the spatial coordinate system are associated with each other. Therefore, with respect to a movement of a hand of the user U1 in the input coordinate system, a display position of the video image P1 moves similarly to the example of FIG. 15. However, since the orientation of the input coordinate system is different from that of the example of FIG. 15, a direction in which the user U1 moves the hand when moving a display position of the video image P1 is different.

In this way, in a case where the input surface (for example, the wall 2Wa) on which the user operation is performed and the display surface (for example, the wall 2Wb) on which the video image P1 is displayed are perpendicular to each other, the axis (Yi axis) of the input coordinate system and the axis (Ys axis) of the spatial coordinate system, which are both parallel to the display surface, are associated with each other. Therefore, a movement of a hand of the user U1 in the Yi-axis direction coincides with a movement direction of the video image P1 on the display surface, and the video image P1 moves in the same direction in accordance with the movement of the hand of the user U1 in the Yi-axis direction. As a result, the user U1 can easily grasp the correspondence between the movement of the hand and the movement of the display position of the video image P1, and the operability is improved.

Note that, in a case where the user operation is switched from the spatial movement of the video image P1 to the UI operation or the local movement of the video image P1, the input coordinate system and the correspondence between the input coordinate system and the spatial coordinate system are changed from the state of FIG. 25 to the state of FIG. 23 or FIG. 24.

Fifth Example

Next, a fifth example will be described with reference to FIGS. 26 to 28.

Figure 26:
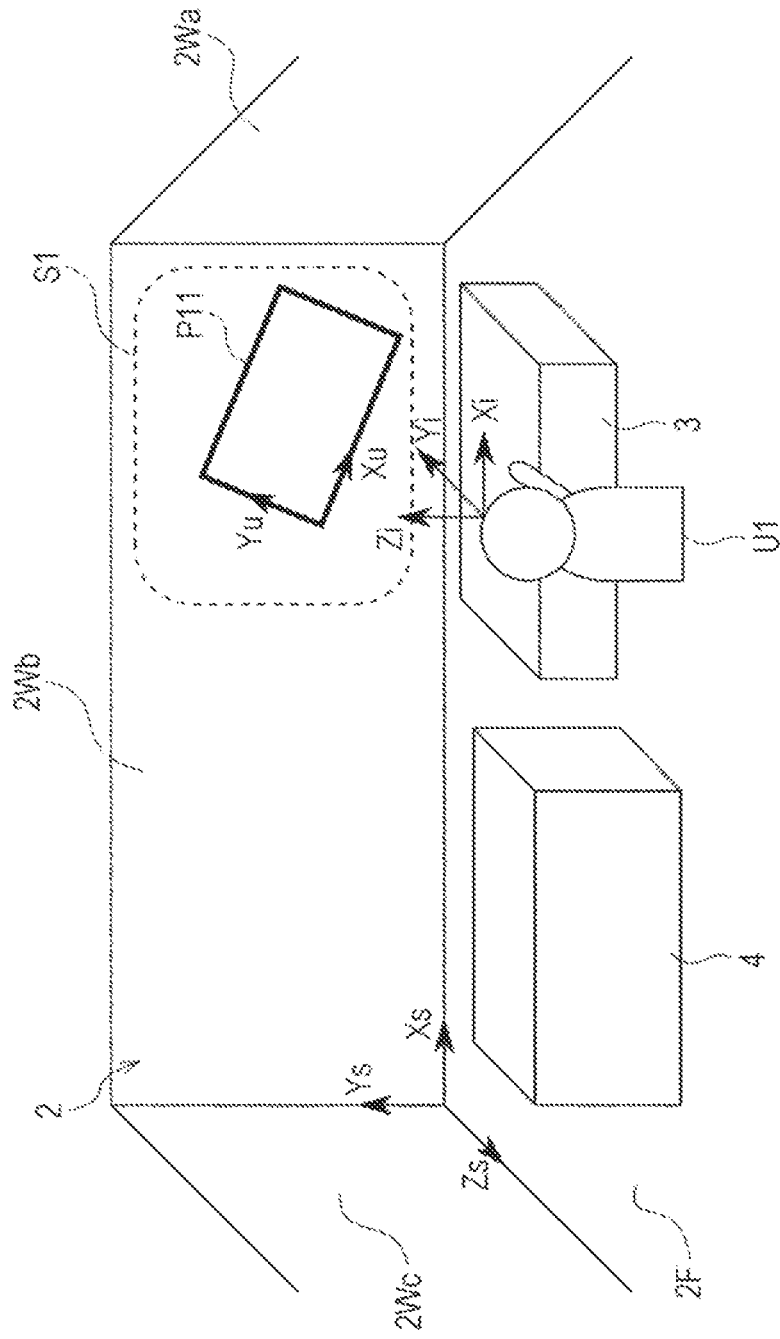
FIG. 26 is a view showing a fifth example of the coordinate system and the display position of the video image.

In the example of FIG. 26, a spatial coordinate system and an input coordinate system are set similarly to the example of FIG. 16.

Furthermore, a video image P11 is displayed on the wall 2Wb similarly to the example of FIG. 16. However, unlike the example of FIG. 16, the video image P11 is tilted with respect to the Xs axis and the Ys axis of the spatial coordinate system. Then, an Xu axis of a UI coordinate system is set in an oblique direction with respect to the Xs axis of the spatial coordinate system. A Yu axis of the UI coordinate system is set in an oblique direction with respect to the Ys axis of the spatial coordinate system.

In a case where a UI operation is performed in this state, similarly to the example of FIG. 16, and an Xi axis of the input coordinate system and the Xu axis of the UI coordinate system are associated with each other, while a Yi axis of the input coordinate system and the Yu axis of the UI coordinate system are associated with each other. Therefore, with respect to a movement of a hand of the user U1 in the input coordinate system, a video image content in the video image P11 moves similarly to the example of FIG. 16. However, since a position and an orientation of the UI coordinate system in the spatial coordinate system are different from those of the example of FIG. 16, a movement direction of the video image content in the video image P11 in the spatial coordinate system is different from that of the example of FIG. 16.

Figure 27:
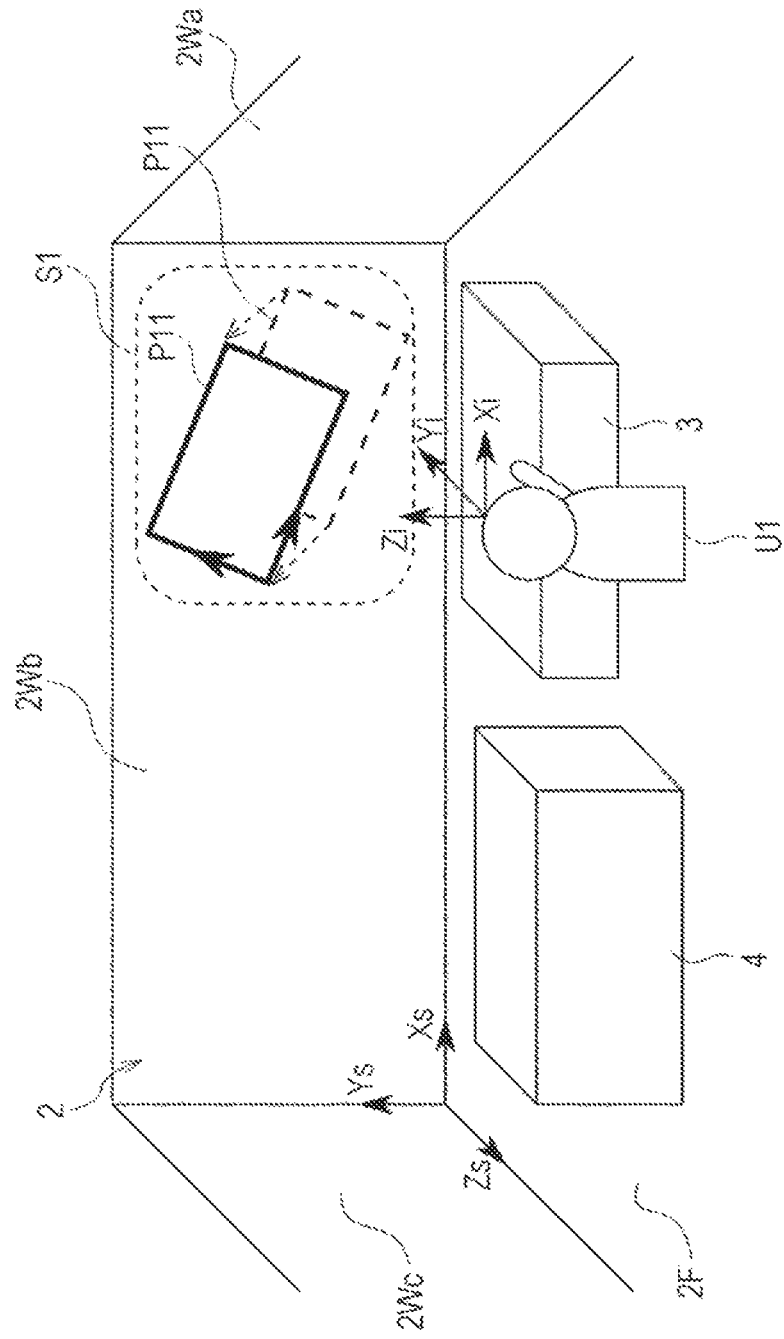
FIG. 27 is a view showing the fifth example of the coordinate system and the display position of the video image.

FIG. 27 shows an example of a case where a local movement of the video image P11 is performed in a state similar to that in FIG. 26.

In this case as well, similarly to the example of FIG. 17, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. However, as compared to the example in FIG. 17, since a position and an orientation of the UI coordinate system in the spatial coordinate system are different, a movement direction of the display position of the video image P11 in the spatial coordinate system with respect to a movement of the hand of the same user U1 is different. In this example, an example is shown in which the display position of the video image P11 moves diagonally on the wall 2Wb in a negative direction of the Xu axis and in a positive direction of the Yu axis, by the user U1 moving a hand in a negative direction of the Xi axis and in a positive direction of the Yi axis.

Figure 28:
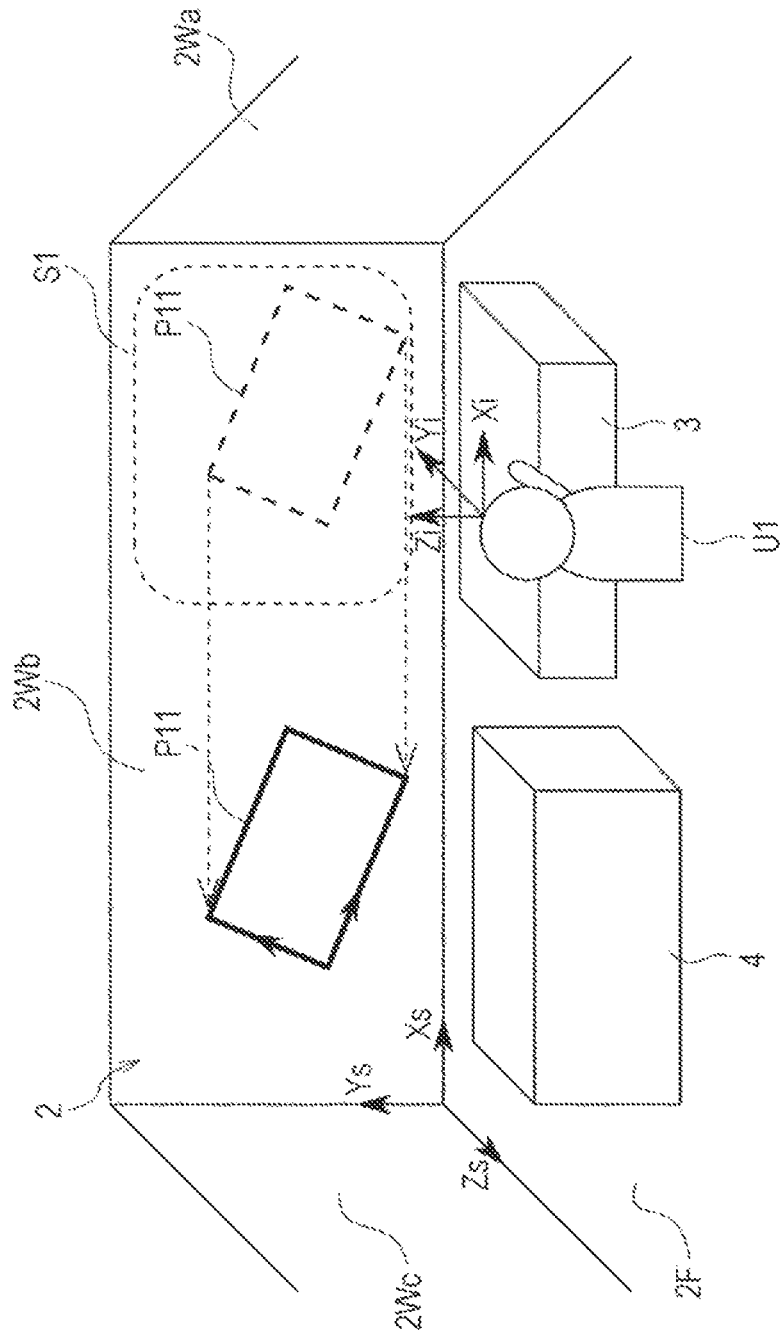
FIG. 28 is a view showing the fifth example of the coordinate system and the display position of the video image.

FIG. 28 shows an example of a case where a spatial movement of the video image P11 is performed in a state similar to that in FIG. 26.

In this case, similarly to the example of FIG. 18, since the Xi axis of the input coordinate system and the Xs axis of the spatial coordinate system are originally set to be parallel and in the same direction, the input coordinate system is not changed. Then, similarly to the example of FIG. 18, the Xi axis of the input coordinate system and the Xs axis of the spatial coordinate system are associated with each other, while the Yi axis of the input coordinate system and the Ys axis of the spatial coordinate system are associated with each other. Therefore, since an orientation of the input coordinate system is the same as that of the example of FIG. 18, the display position of the video image P11 can be moved by a hand movement similar to that of the example of FIG. 18. However, the video image P11 moves in a state of being tilted with respect to the spatial coordinate system.

In this way, in a case where the video image P11 is displayed to be tilted with respect to an axis of the spatial coordinate system, a local movement and a spatial movement of the video image P11 are performed while the video image P11 is tilted, by a method similar to the above-mentioned example.

Note that, in a case where the user operation is switched from the spatial movement of the video image P11 to the UI operation or the local movement of the video image P11, the input coordinate system and the correspondence between the input coordinate system and the spatial coordinate system are changed from the state of FIG. 28 to the state of FIG. 26 or FIG. 27.

Sixth Example

Next, a sixth example will be described with reference to FIGS. 29 to 31.

Figure 29:
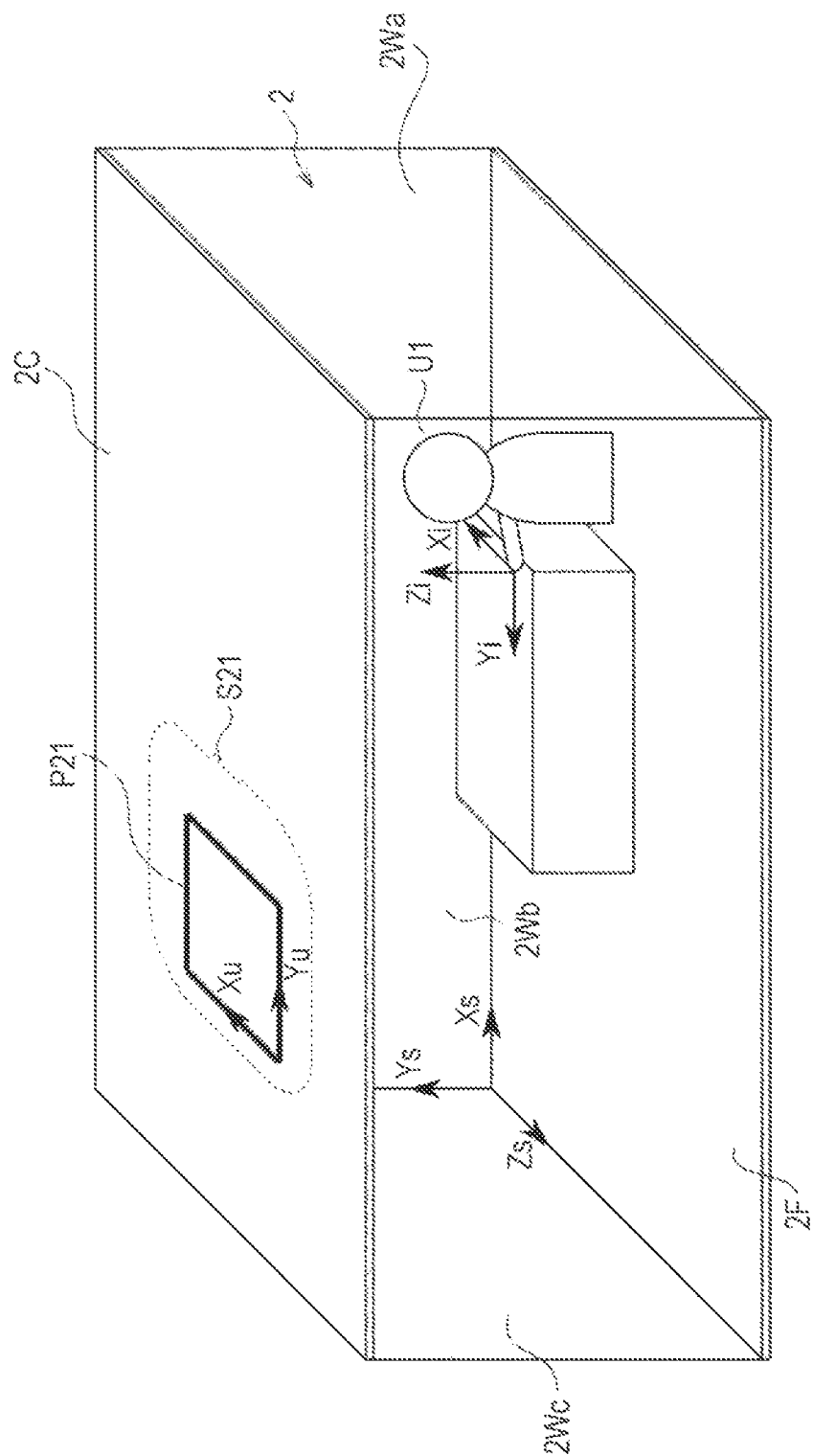
FIG. 29 is a view showing a sixth example of the coordinate system and the display position of the video image.

In the example of FIG. 29, a spatial coordinate system and an input coordinate system are set similarly to the example of FIG. 13.

Furthermore, a video image P21 is displayed on the ceiling 2C. That is, the ceiling 2C is set as a display surface. An Xu axis of a UI coordinate system is set parallel to and opposite to the Zs axis of the spatial coordinate system. A Yu axis is set parallel to and in the same direction as the Xs axis of the spatial coordinate system.

In a case where a UI operation is performed in this state, similarly to the example in FIG. 13, an Xi axis of the input coordinate system and an Xu axis of the UI coordinate system are associated with each other, while a Yi axis of the input coordinate system and a Yu axis of the UI coordinate system are associated with each other. Therefore, with respect to a movement of a hand of the user U1 in the input coordinate system, a video image content in the video image P21 moves similarly to the example of FIG. 13. However, since a position and an orientation of the UI coordinate system in the spatial coordinate system are different from those of the example of FIG. 13, a movement direction of the video image content in the video image P21 in the spatial coordinate system is different from that of the example of FIG. 13.

Figure 30:
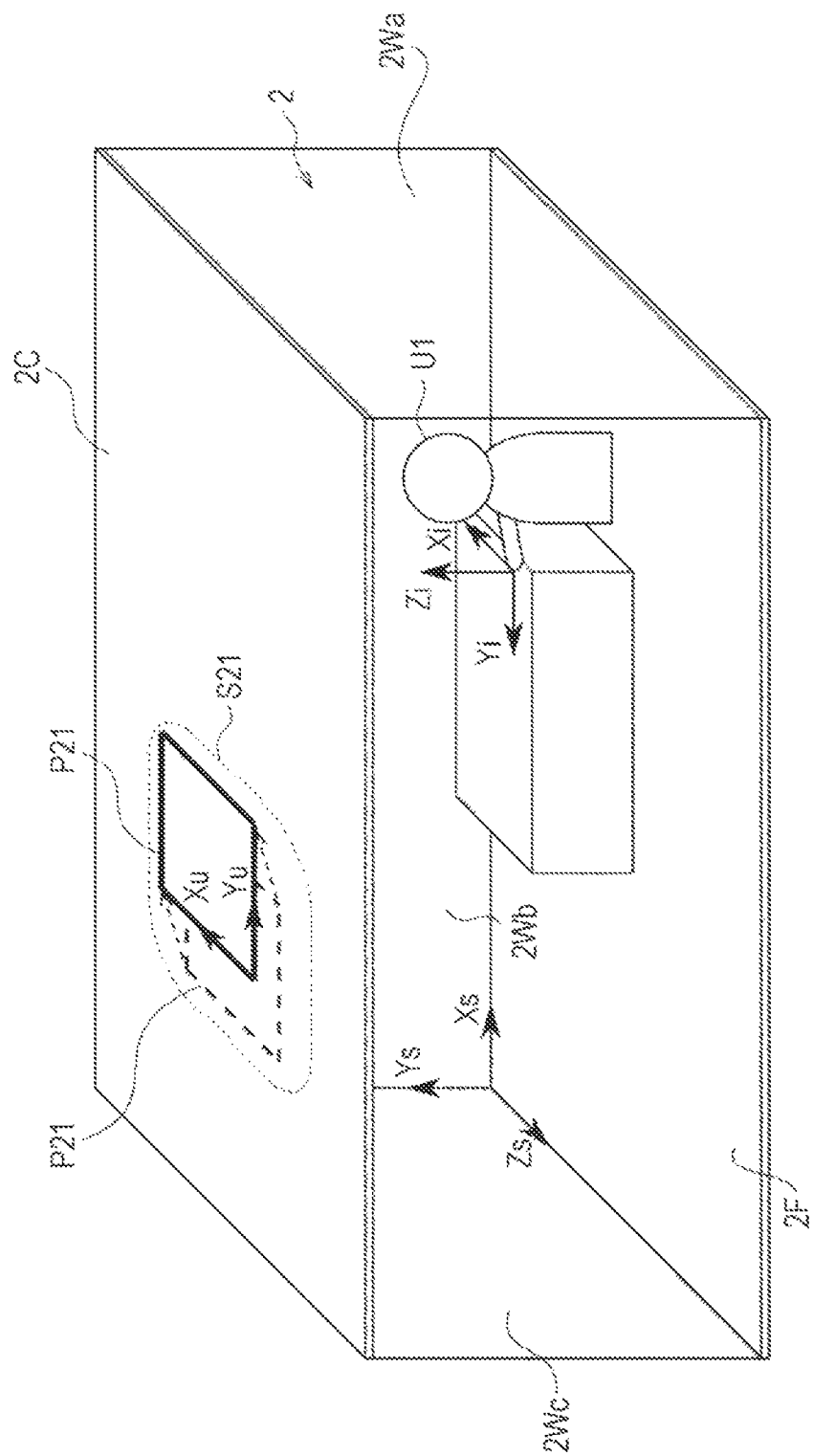
FIG. 30 is a view showing the sixth example of the coordinate system and the display position of the video image.

FIG. 30 shows an example of a case where the video image P21 is within a predetermined range S21, and a local movement is performed in a state similar to that in FIG. 29.

In this case as well, similarly to the example of FIG. 14, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. However, as compared to the example in FIG. 14, since a position and an orientation of the UI coordinate system in the spatial coordinate system are different, a movement direction of the display position of the video image P21 in the spatial coordinate system with respect to a movement of the hand of the same user U1 is different. In this example, an example is shown in which the display position of the video image P21 moves diagonally on the ceiling We in a positive direction of the Xu axis and in a positive direction of the Yu axis, by the user U1 moving a hand in a positive direction of the Xi axis and in a positive direction of the Yi axis.

Figure 31:
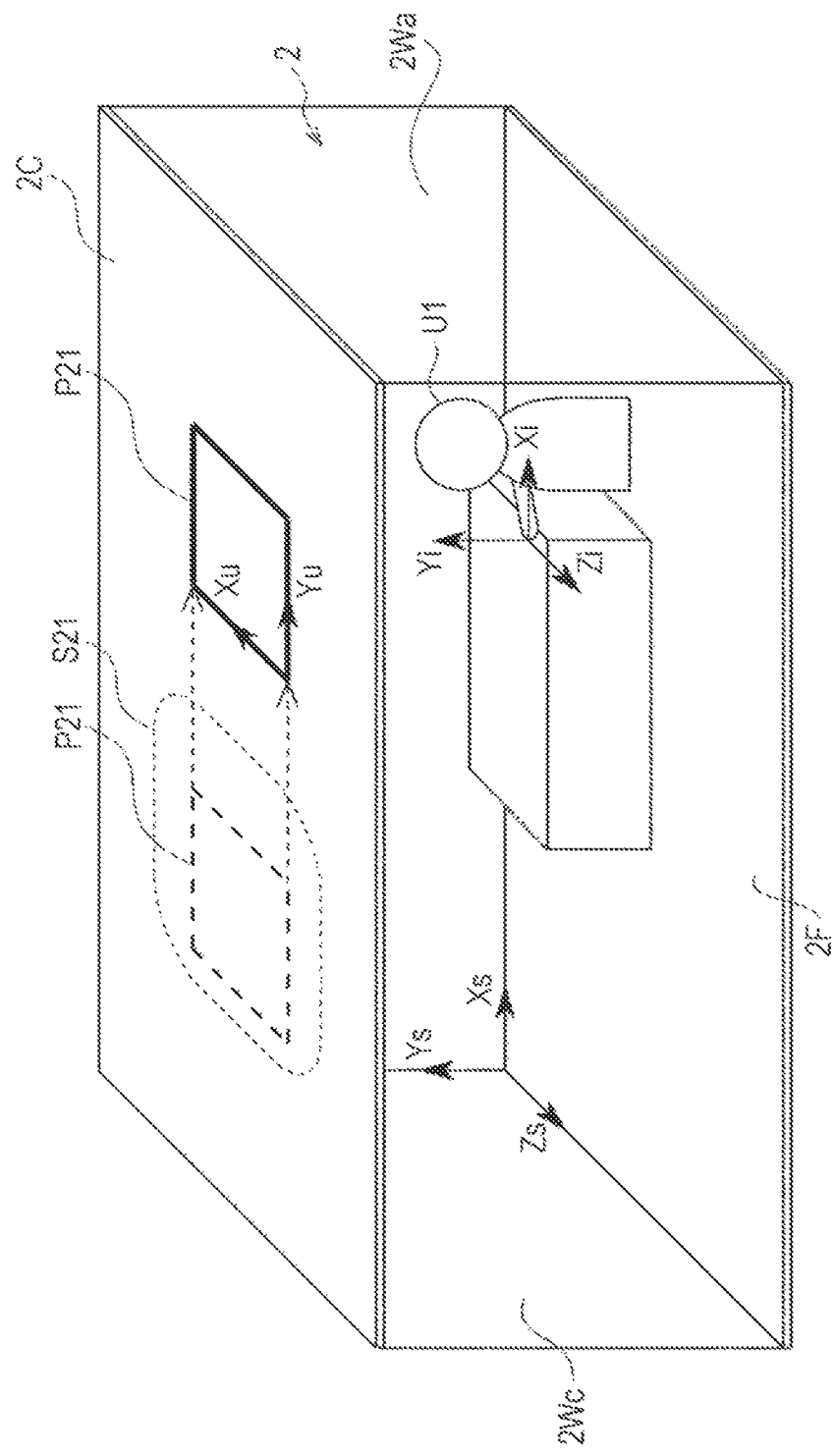
FIG. 31 is a view showing the sixth example of the coordinate system and the display position of the video image.

FIG. 31 shows an example of a case where a spatial movement of the video image P21 is performed in a state similar to that in FIG. 29.

In this case, the input coordinate system is changed in accordance with the spatial coordinate system. Specifically, while a position of the origin of the input coordinate system does not change, the Xi axis of the input coordinate system is set parallel to and in the same direction as the Xs axis of the spatial coordinate system, on the upper surface of the desk 3. The Yi axis is set in a direction perpendicular to the upper surface of the desk 3, that is, in a direction parallel to and in the same direction as the Ys axis of the spatial coordinate system. A Zi axis is set on the upper surface of the desk 3 in a direction parallel to and the same direction as the Zs axis of the spatial coordinate system.

Then, the Xi axis of the input coordinate system and the Xs axis of the spatial coordinate system are associated with each other, while the Zi axis of the input coordinate system and the Zs axis of the spatial coordinate system are associated with each other. As a result, for example, a movement of a hand of the user U1 in the Xi-axis direction is reflected in a movement of a display position of the video image P21 in the Xs-axis direction, while a movement of a hand of the user U1 in the Zi-axis direction is reflected in a movement of the display position of the video image P21 in the Zs-axis direction. For example, the display position of the video image P21 moves in the Xs-axis direction and the Zs-axis direction on the ceiling 2C in accordance with a movement of a hand of the user U1 in the Xi-axis direction and the Zi-axis direction. In this example, an example is shown in which the display position of the video image P21 moves in a positive direction of the Xs axis on the ceiling 2C, by the user U1 moving a hand in a positive direction of the Xi axis.

In this way, in a case where the input surface (for example, the upper surface of the desk 3) on which the user operation is performed and the display surface (for example, the ceiling 2C) on which the video image P21 is displayed are parallel to each other, axes (the Xi axis and the Zi axis) of the input coordinate system and axes (the Xs axis and the Zs axis) of the spatial coordinate system, which are both parallel to the display surface, are associated with each other. As a result, a movement direction of the hand of the user U1 coincides with a movement direction of the video image P21 on the display surface, and the video image P21 moves in the same direction in accordance with a movement of the hand of the user U1. As a result, the user U1 can easily grasp the correspondence between the movement of the hand and the movement of the display position of the video image P21, and the operability is improved.

Note that, in a case where the user operation is switched from the spatial movement of the video image P21 to the UI operation or the local movement of the video image P21, the input coordinate system and the correspondence between the input coordinate system and the spatial coordinate system are changed from the state of FIG. 31 to the state of FIG. 29 or FIG. 30.

Seventh Example

Next, a seventh example will be described with reference to FIGS. 32 to 34.

Figure 32:
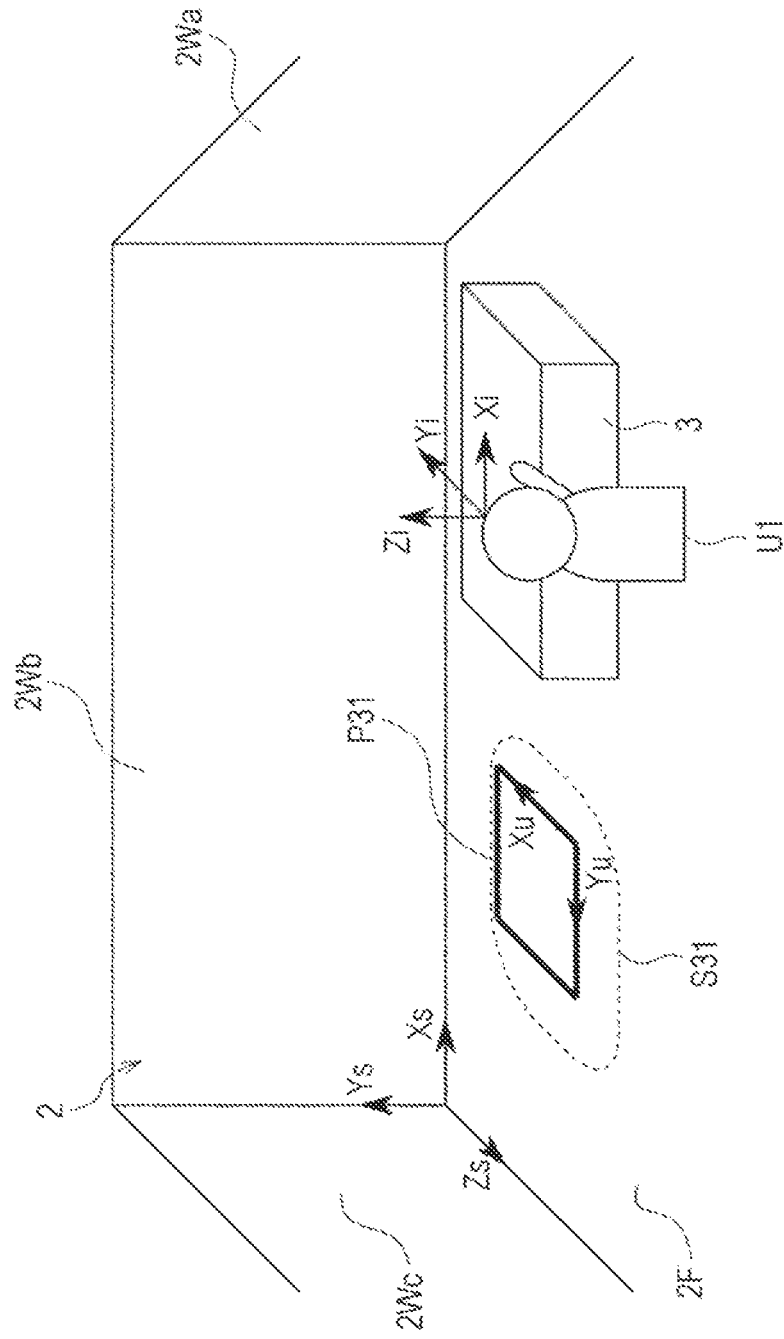
FIG. 32 is a view showing a seventh example of the coordinate system and the display position of the video image.

In the example of FIG. 32, a spatial coordinate system and an input coordinate system are set similarly to the example of FIG. 16.

Furthermore, a video image P31 is displayed on the floor 2F. That is, the floor 2F is set as a display surface. An Xu axis of a UI coordinate system is set parallel to and opposite to the Zs axis of the spatial coordinate system. A Yu axis is set parallel to and in an opposite direction to the Xs axis of the spatial coordinate system.

In a case where a UI operation is performed in this state, similarly to the example of FIG. 16, and an Xi axis of the input coordinate system and the Xu axis of the UI coordinate system are associated with each other, while a Yi axis of the input coordinate system and the Yu axis of the UI coordinate system are associated with each other. Therefore, with respect to a movement of a hand of the user U1 in the input coordinate system, a video image content in the video image P31 moves similarly to the example of FIG. 16. However, since a position and an orientation of the UI coordinate system in the spatial coordinate system are different from those of the example of FIG. 16, a movement direction of the video image content in the video image P31 in the spatial coordinate system is different from that of the example of FIG. 16.

Figure 33:
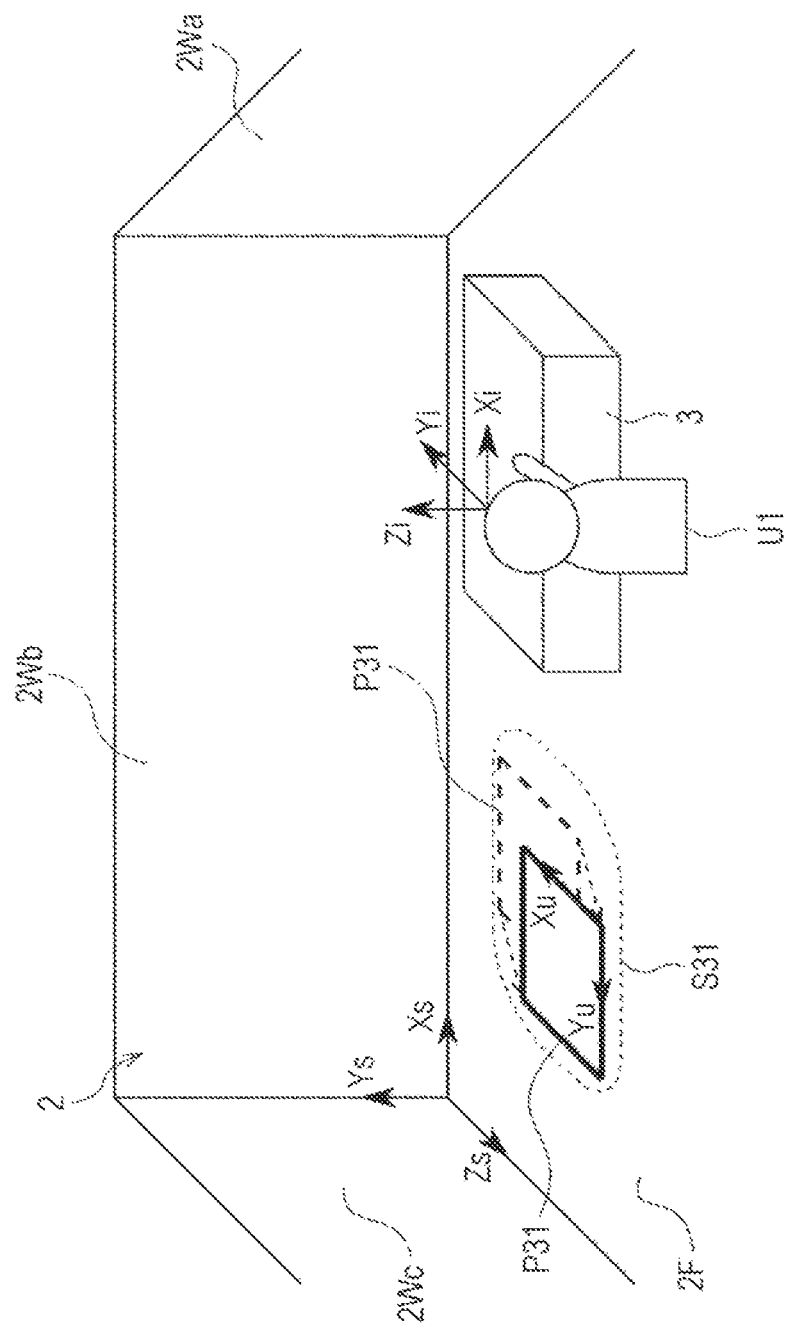
FIG. 33 is a view showing the seventh example of the coordinate system and the display position of the video image.

FIG. 32 shows an example of a case where the video image P31 is within a predetermined range S31, and a local movement is performed in a state similar to that in FIG. 33.

In this case as well, similarly to the example of FIG. 17, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other. However, as compared to the example in FIG. 17, since a position and an orientation of the UI coordinate system in the spatial coordinate system are different, a movement direction of the display position of the video image P31 in the spatial coordinate system with respect to a movement of the hand of the same user U1 is different. In this example, an example is shown in which the display position of the video image P31 moves diagonally on the floor 2F in a negative direction of the Xu axis and in a positive direction of the Yu axis, by the user U1 moving a hand in a negative direction of the Xi axis and in a positive direction of the Yi axis.

Figure 34:
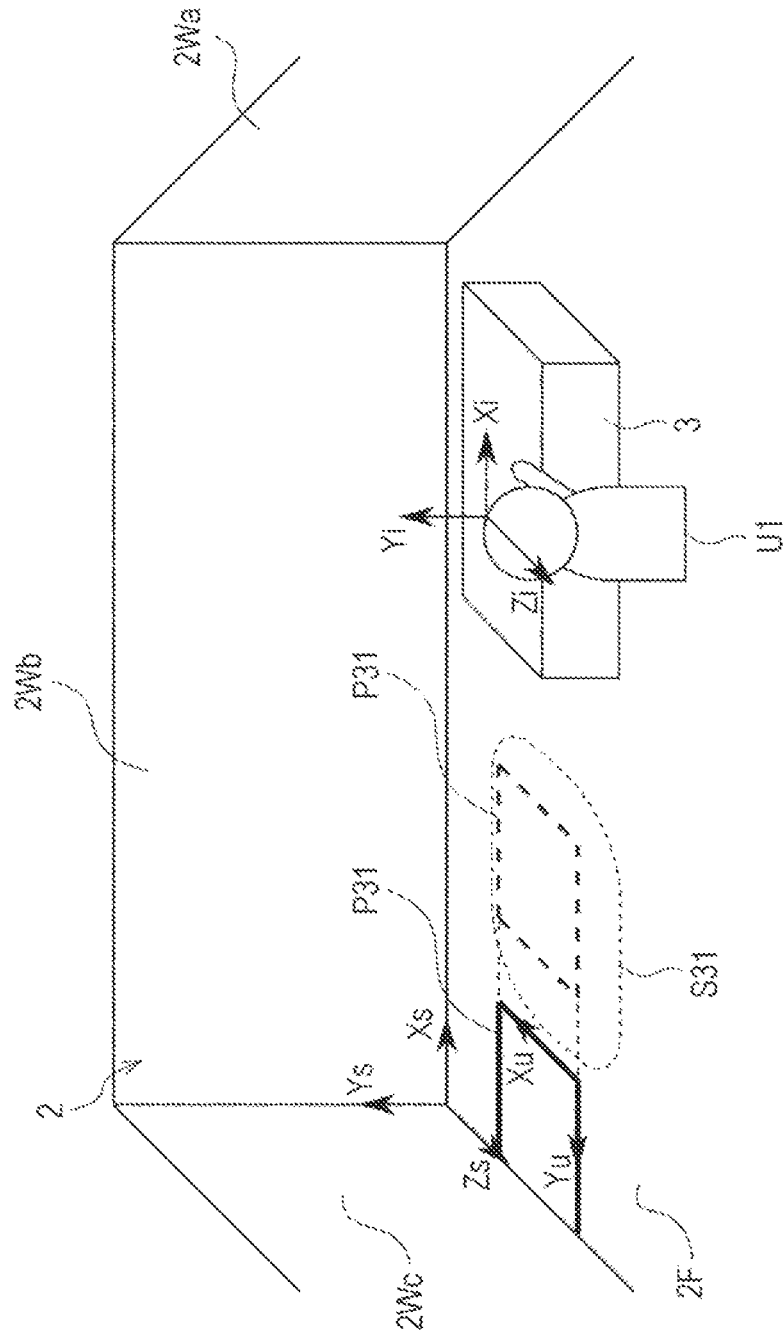
FIG. 34 is a view showing the seventh example of the coordinate system and the display position of the video image.

FIG. 34 shows an example of a case where a spatial movement of the video image P31 is performed in a state similar to that in FIG. 32.

In this case, the input coordinate system is changed in accordance with the spatial coordinate system. Specifically, each axis of the input coordinate system is set in a direction similar to that of the example of FIG. 31, without a change in a position of the origin.

Then, the Xi axis of the input coordinate system and the Xs axis of the spatial coordinate system are associated with each other, while the Zi axis of the input coordinate system and the Zs axis of the spatial coordinate system are associated with each other. As a result, for example, a movement of a hand of the user U1 in the Xi-axis direction is reflected in a movement of a display position of the video image P31 in the Xs-axis direction, while a movement of a hand of the user U1 in the Zi-axis direction is reflected in a movement of the display position of the video image P31 in the Zs-axis direction. For example, the display position of the video image P31 moves in the Xs-axis direction and the Zs-axis direction on the floor 2F in accordance with a movement of a hand of the user U1 in the Xi-axis direction and the Zi-axis direction. In this example, an example is shown in which the display position of the video image P31 moves in a negative direction of the Xs axis on the floor 2F, by the user U1 moving a hand in a negative direction of the Xi axis.

In this way, in a case where the input surface (for example, the upper surface of the desk 3) on which the user operation is performed and the display surface (for example, the floor 2F) on which the video image P31 is displayed are parallel to each other, axes (the Xi axis and the Zi axis) of the input coordinate system and axes (the Xs axis and the Zs axis) of the spatial coordinate system, which are parallel to the display surface, are associated with each other. As a result, a movement direction of the hand of the user U1 coincides with a movement direction of the video image P31 on the display surface, and the video image P31 moves in the same direction in accordance with a movement of the hand of the user U1. As a result, the user U1 can easily grasp the correspondence between the movement of the hand and the movement of the display position of the video image P31, and the operability is improved.

Note that, in a case where the user operation is switched from the spatial movement of the video image P31 to the UI operation or the local movement of the video image P11, the input coordinate system and the correspondence between the input coordinate system and the spatial coordinate system are changed from the state of FIG. 34 to the state of FIG. 32 or FIG. 33.

Eighth Example

Next, an eighth example will be described with reference to FIGS. 35 to 37.

Figure 35:
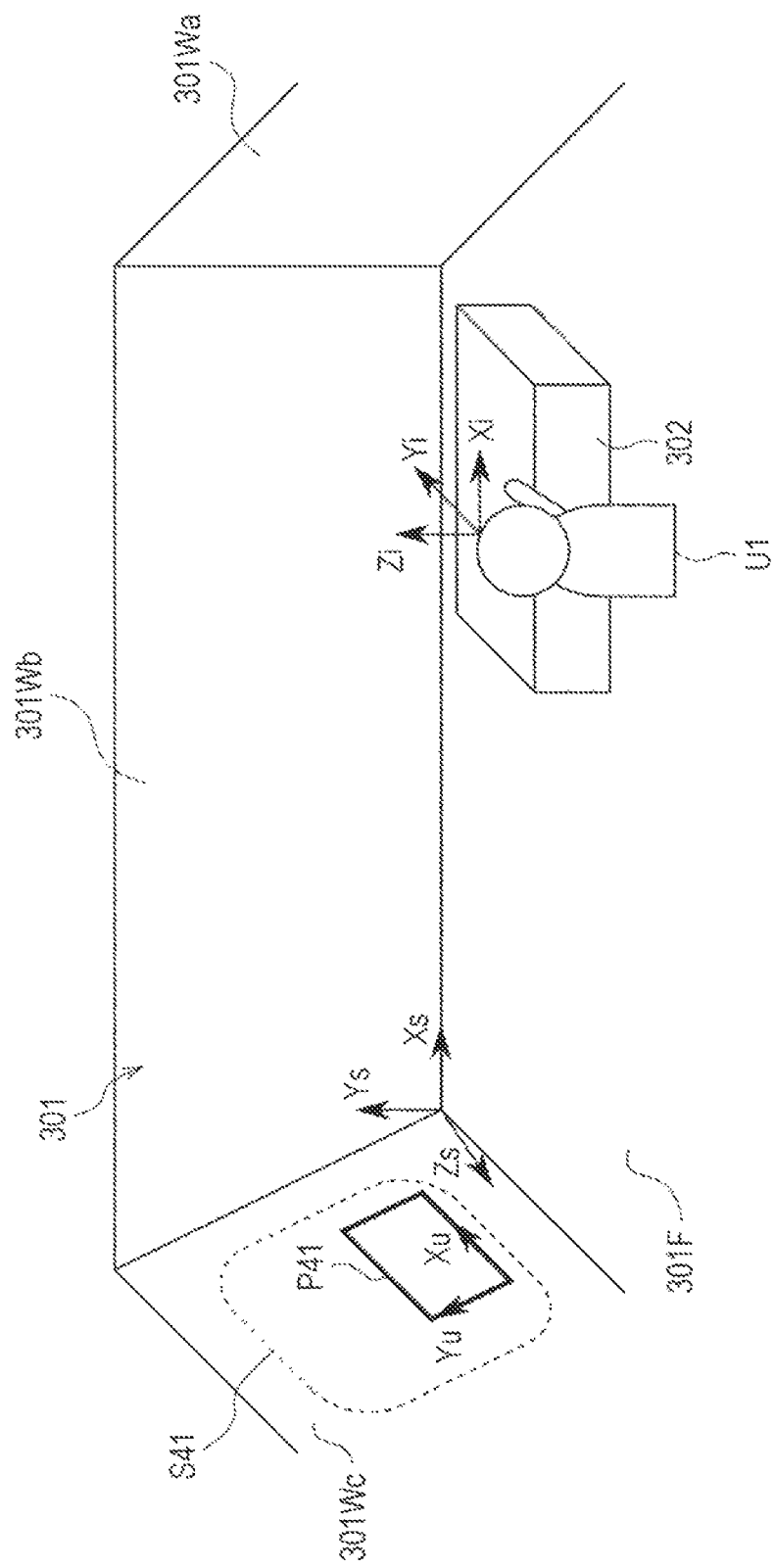
FIG. 35 is a view showing an eighth example of the coordinate system and the display position of the video image.
Figure 36:
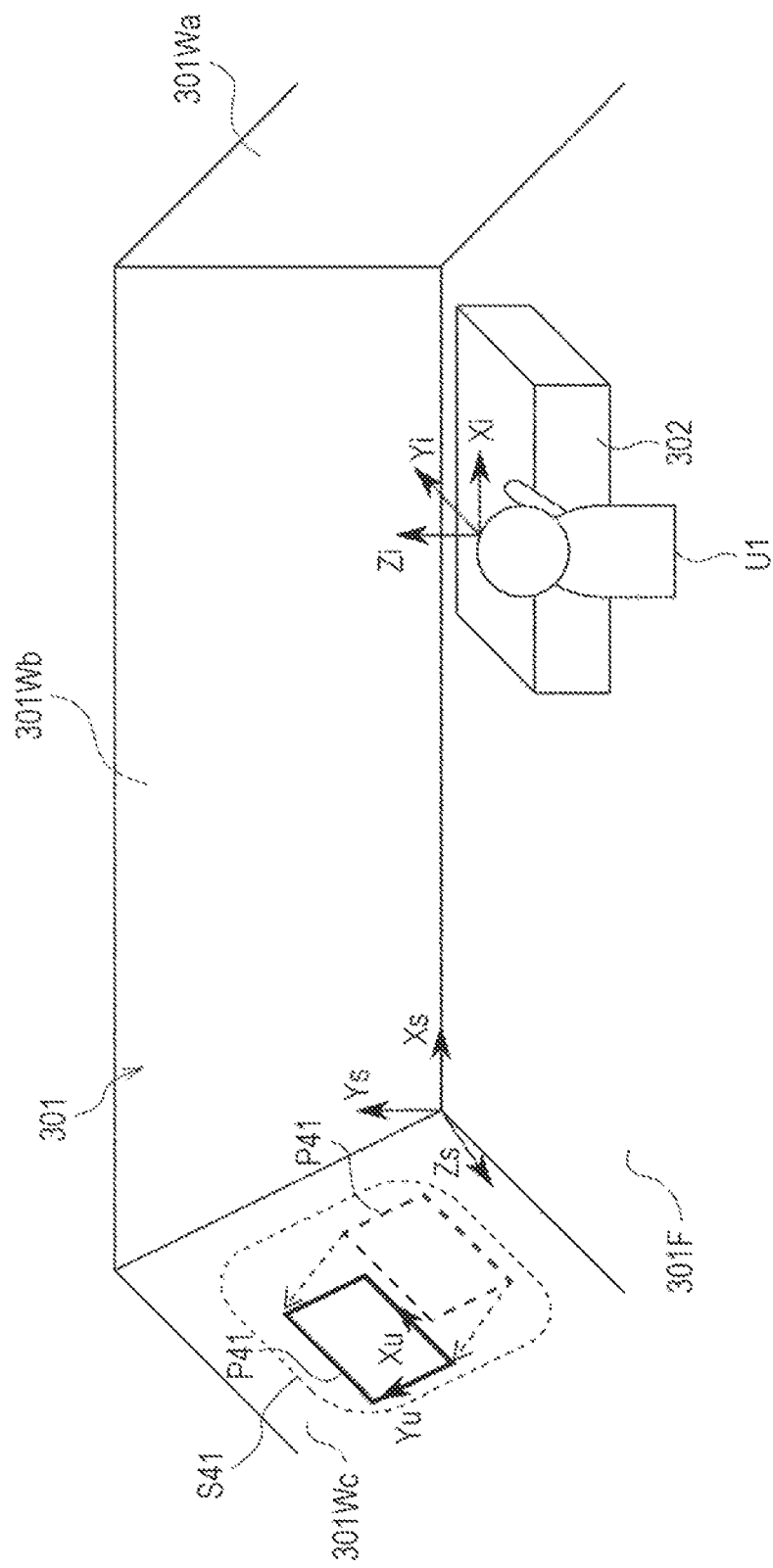
FIG. 36 is a view showing the eighth example of the coordinate system and the display position of the video image.
Figure 37:
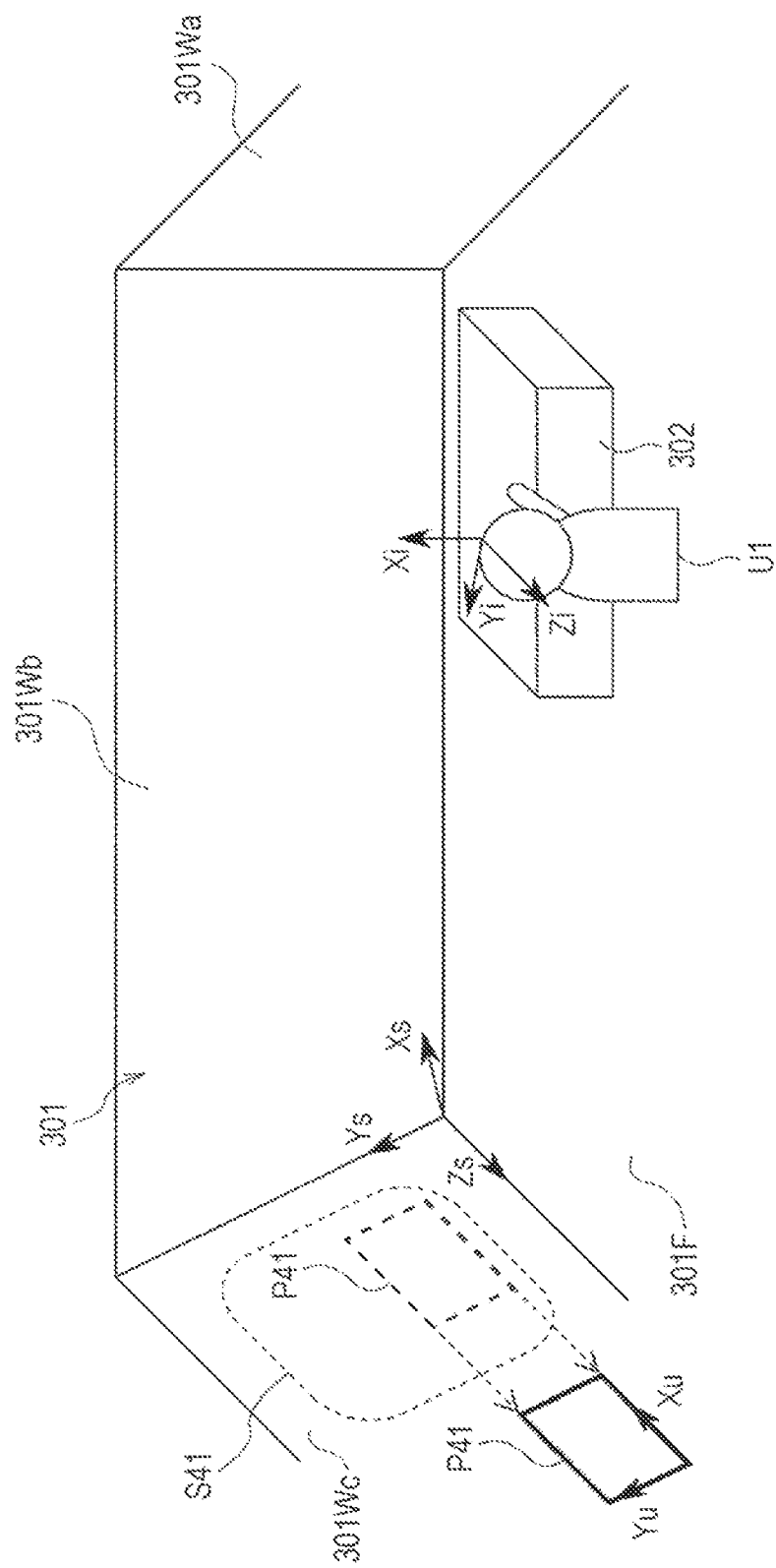
FIG. 37 is a view showing the eighth example of the coordinate system and the display position of the video image.

In the example of FIGS. 35 to 37, inside of a room 301 is set as a display space. The room 301 is a space surrounded by a ceiling 301C (not illustrated), a floor 301F, and walls 301Wa to 301Wd in four directions (however, the wall 301Wd is not illustrated). In the room 301, a desk 302 is arranged.

The floor 301F, the wall 301Wa, and the wall 301Wb are orthogonal to each other. Whereas, the wall 301Wc is tilted with respect to the wall 301Wb and the floor 301F.

In the example of FIG. 35, the origin of a spatial coordinate system is set at an intersection of the wall 301Wb, the wall 301Wc, and the floor 301F. An Xs axis is set in a direction in which the wall 301Wb extends in a lateral direction, and a Ys axis is set in a vertical upward direction. A Zs axis is set to be orthogonal to the Xs axis and the Ys axis. Therefore, the Ys axis and the Zs axis are tilted diagonally with respect to the wall 301Wc.

Furthermore, an upper surface of the desk 302 is set as an input surface. An Xi axis of the input coordinate system is set parallel to and in the same direction as the Xs axis of the spatial coordinate system, on the upper surface of the desk 302. A Yi axis is set on the upper surface of the desk 302, in a direction parallel to and opposite to the Zs axis of the spatial coordinate system. A Zi axis is set in a direction perpendicular to the upper surface of the desk 302, that is, in a direction parallel to and in the same direction as the Ys axis of the spatial coordinate system.

Moreover, the wall 301Wc is set as a display surface, and a video image P41 is displayed on the wall 301Wc. Furthermore, the video image P41 is displayed such that each side is parallel to each side of the wall 301Wc. Therefore, Xu and Yu axes of the UI coordinate system are tilted rather than parallel to the respective axes of the spatial coordinate system.

In a case where a UI operation is performed in this state, the Xi axis of the input coordinate system and the Xu axis of the UI coordinate system are associated with each other, while the Yi axis of the input coordinate system and the Yu axis of the UI coordinate system are associated with each other. As a result, for example, a movement of a hand of the user U1 in the Xi-axis direction is reflected in a movement of a video image content in the video image P41 in the Xu-axis direction, while a movement of a hand of the user U1 in the Yi-axis direction is reflected in a movement of the video image content in the video image P1 in the Yu-axis direction. For example, the video image content in the video image P41 scrolls in the Xu-axis direction and the Yu-axis direction in accordance with a movement of a hand of the user U1 in the Xi-axis direction and the Yi-axis direction.

FIG. 36 shows an example of a case where a local movement of the video image P1 is performed within a predetermined range S41 in a state similar to that in FIG. 35.

In this case as well, the input coordinate system is set similarly to the case where the UI operation is performed, and the Xi axis of the input coordinate system and the Xu axis of the UI coordinate system are associated with each other, while the Yi axis of the input coordinate system and the Yu axis of the UI coordinate system are associated with each other, similarly to the case where the UI operation is performed. As a result, for example, a movement of a hand of the user U1 in the Xi-axis direction is reflected in a movement of a display position of the video image P41 in the Xu-axis direction, while a movement of a hand of the user U1 in the Yi-axis direction is reflected in a movement of the display position of the video image P1 in the Yu-axis direction. For example, the display position of the video image P41 moves in the Xu-axis direction and the Yu-axis direction on the wall 301Wc in accordance with a movement of a hand of the user U1 in the Xi-axis direction and the Yi-axis direction. In this example, an example is shown in which the display position of the video image P41 moves diagonally on the wall 2Wb in a negative direction of the Xu axis and in a positive direction of the Yu axis, by the user U1 moving a hand in a negative direction of the Xi axis and in a positive direction of the Yi axis.

FIG. 37 shows an example of a case where a spatial movement of the video image P41 is performed in a state similar to that in FIG. 35.

In this case, the spatial coordinate system is changed in accordance with the wall 301Wc, which is the display surface. Specifically, while a position of the origin of the spatial coordinate system remains the same, the Zs axis of the spatial coordinate system is set in a direction in which the wall 301Wc extends in a lateral direction, while the Ys axis is set in a direction in which the wall 301Wc extends in a vertical direction. The Xs axis is set so as to be orthogonal to the Ys axis and the Zs axis.

Furthermore, the input coordinate system is changed in accordance with the spatial coordinate system. Specifically, while the input surface and a position of the origin of the input coordinate system remain the same, the Zi axis of the input coordinate system is set in the same direction as the Zs axis of the spatial coordinate system as much as possible, on the upper surface of the desk 302. As a result, the Zi axis is set to be as parallel as possible to the display surface (the wall 301Wc). The Yi axis is set perpendicular to the Zi axis on the upper surface of the desk 3. The Xi axis is set in a direction perpendicular to the upper surface of the desk 3.

Then, the Zi axis of the input coordinate system and the Zs axis of the spatial coordinate system are associated with each other, while the Yi axis of the input coordinate system and the Ys axis of the spatial coordinate system are associated with each other. As a result, for example, a movement of a hand of the user U1 in the Zi-axis direction is reflected in a movement of a display position of the video image P41 in the Zs-axis direction, while a movement of a hand of the user U1 in the Yi-axis direction is reflected in a movement of the display position of the video image P41 in the Ys-axis direction. For example, the display position of the video image P41 moves in the Zs-axis direction and the Ys-axis direction on the wall 301Wc in accordance with a movement of a hand of the user U1 in the Zi-axis direction and the Yi-axis direction. In this example, an example is shown in which the display position of the video image P41 moves in a positive direction of the Zs axis on the wall 301Wc, by the user U1 moving a hand in a positive direction of the Zi axis.

In this way, in a case where the display surface (for example, the wall 301Wc) is tilted with respect to the input surface (for example, the upper surface of the desk 302), the spatial coordinate system and the input coordinate system are set such that at least one axis of the input coordinate system (for example, the Zi axis) is as parallel as possible to the display surface (the Zs axis). Therefore, a movement of a hand of the user U1 in the Zi-axis direction substantially coincides with a movement direction of the video image P41 on the display surface, and the video image P41 moves in substantially the same direction in accordance with the movement of the hand of the user U1 in the Zi-axis direction. As a result, the user U1 can easily grasp the correspondence between the movement of the hand and the movement of the display position of the video image P41, and the operability is improved.

Note that, in a case where the user operation is switched from the spatial movement of the video image P41 to the UI operation or the local movement of the video image P41, the input coordinate system and the correspondence between the input coordinate system and the spatial coordinate system are changed from the state of FIG. 37 to the state of FIG. 35 or FIG. 36.

2. Modified Example

Hereinafter, a modified example of the above-described embodiment of the present technology will be described.

The present technology can also be applied to a case of performing an operation using an operation body other than the user's hand. Furthermore, the operation body may be all or a part of the user's body, or may be an operating member other than the user's body. The operating member other than the user's body may be a dedicated operating member, or a general object may be used as the operating member.

Furthermore, in a case where an operation body other than the user's hand is used, for example, an input coordinate system may be set on the basis of an orientation of the operation body, similarly to the case of using a hand.

Moreover, the present technology can also be applied to a case where a virtual plane is set as an input surface instead of a physical plane. In a case where a virtual plane is set as the input surface, for example, a hover operation is performed on the input surface.

Furthermore, the present technology can also be applied to a case where the display surface is a curved surface. In a case where the display surface is a curved surface, for example, the curved surface is approximated to a plane, the approximated plane is regarded as a display surface, and the above-described processing is performed. Note that, in a case of displaying a video image on a curved surface having a large curvature such as a cylindrical wall, for example, the curved surface is approximated by a plurality of planes and the above-described processing is performed.

Moreover, in a case where there are projections and depressions (for example, a column, a frame, a knob, a handle, and the like) that are smaller than the display surface, for example, the projections and depressions may be ignored and the display surface may be approximated to one plane. As a result, control of the coordinate system can be easy, frequent changes in the input coordinate system are prevented, and user's operability is improved.

Furthermore, for example, it is also possible to approximate the display surface to a large surface, while ignoring small objects (for example, an electric appliance, small furniture, and the like) as compared with a large surface such as a wall, a floor, or a ceiling in the display space. As a result, control of the coordinate system can be easy, frequent changes in the input coordinate system are prevented, and user's operability is improved.

Moreover, a video image may be projected from the front of the display surface or may be projected from the back of the display surface. Furthermore, for example, a wall or the like in the display space may be configured by a large display such as an organic EL or a liquid crystal, and a video image may be displayed on the display and moved in the display.

Furthermore, a display space model may be generated by stereo matching (a passive stereo system), structure from motion (SfM), or the like by using, for example, a plurality of radar ranging sensors or a plurality of cameras, instead of the depth sensor 183. Moreover, a plurality of radar ranging sensors or a plurality of cameras may be used instead of the depth sensor 101.

Furthermore, for example, a touching operation by the user on the input surface may be detected on the input surface side by using a capacitance sensor or the like.

Moreover, for example, the detection device 11 may be provided with a drive mechanism such that the depth sensor 101 can be directed to any position in the display space. As a result, options of the input surface that can be used by the user are increased.

Moreover, in a case where there is a plurality of users in the display space, for example, the input coordinate system is only required to be set or changed for each user by the method described above. As a result, each user can individually perform the UI operation, a local movement of a video image, and a spatial movement of the video image.

3. Other

<Computer Configuration Example>

The series of processing described above can be executed by hardware or software. In a case where the series of processing is performed by software, a program that configures the software is installed in a computer. Here, examples of the computer include, for example, a computer that is built in dedicated hardware, a general-purpose personal computer that can perform various functions by being installed with various programs, and the like.

Figure 38:
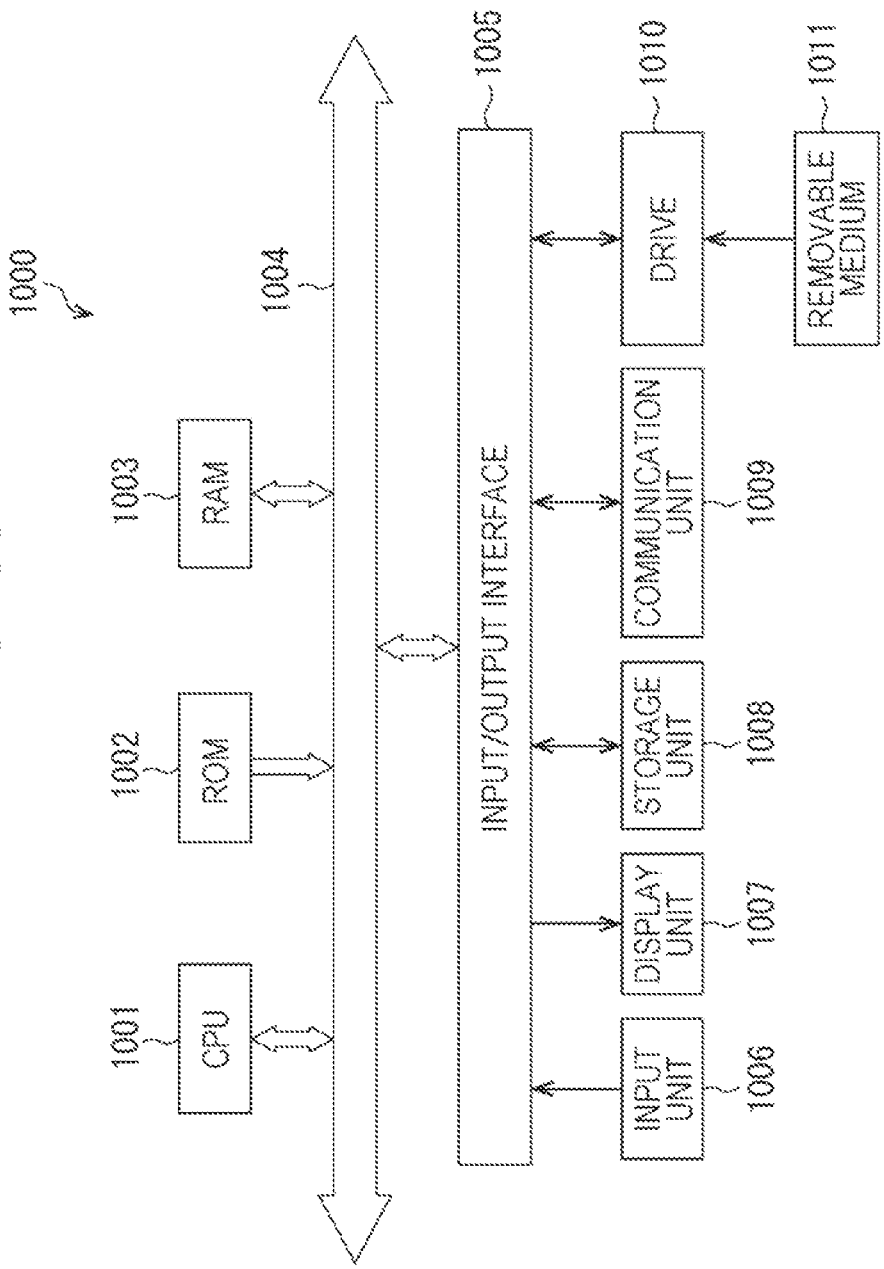
FIG. 38 is a diagram showing a configuration example of a computer.

FIG. 38 is a block diagram showing a configuration example of hardware of a computer that executes the series of processing described above in accordance with a program.

In a computer 1000, a central processing unit (CPU) 1001, a read only memory (ROM) 1002, and a random access memory (RAM) 1003 are mutually connected by a bus 1004.

The bus 1004 is further connected with an input/output interface 1005. To the input/output interface 1005, an input unit 1006, an output unit 1007, a storage unit 1008, a communication unit 1009, and a drive 1010 are connected.

The input unit 1006 includes an input switch, a button, a microphone, an image sensor, and the like. The output unit 1007 includes a display, a speaker, and the like. The storage unit 1008 includes a hard disk, a non-volatile memory, and the like. The communication unit 1009 includes a network interface or the like. The drive 1010 drives a removable medium 1011 such as a magnetic disk, an optical disk, a magneto-optical disk, or a semiconductor memory.

In the computer 1000 configured as described above, the series of processing described above is performed, for example, by the CPU 1001 loading a program stored in the storage unit 1008 into the RAM 1003 via the input/output interface 1005 and the bus 1004, and executing.

The program executed by the computer 1000 (the CPU 1001) can be provided by being recorded on, for example, the removable medium 1011 as a package medium or the like. Furthermore, the program can be provided via a wired or wireless transmission medium such as a local area network, the Internet, or digital satellite broadcasting.

In the computer 1000, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. Besides, the program can be installed in advance in the ROM 1002 and the storage unit 1008.

Note that the program executed by the computer may be a program that performs processing in a time series according to an order described in this specification, or may be a program that performs processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Moreover, the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can have the following configurations.

(1)

An information processing apparatus including:

a coordinate system setting unit configured to change an input coordinate system on the basis of a user operation; and a video image control unit configured to control a content in a video image on the basis of a first input coordinate system, and control a display position of the video image on the basis of a second input coordinate system.

(2)

The information processing apparatus according to (1) above, in which the coordinate system setting unit sets the second input coordinate system in accordance with a display surface on which the video image is displayed.

(3)

The information processing apparatus according to (2) above, in which the coordinate system setting unit causes at least one of movement directions of an operation body used for a user operation in the second input coordinate system to substantially coincide with at least one of movement directions of the video image on the display surface.

(4)

The information processing apparatus according to (2) or (3) above, in which the coordinate system setting unit changes the second input coordinate system in accordance with a change of the display surface.

(5)

The information processing apparatus according to (4) above, in which in a case where a display position of the video image moves from a first display surface to a second display surface, the coordinate system setting unit changes the second input coordinate system in accordance with the second display surface.

(6)

The information processing apparatus according to (5) above, in which after a display position of the video image moves from the first display surface to the second display surface, the coordinate system setting unit changes the second input coordinate system after the movement of the video image stops.

(7)

The information processing apparatus according to any one of (2) to (6) above, in which in a case where the display surface is a curved surface, the coordinate system setting unit sets the second input coordinate system in accordance with a plane that approximates the curved surface.

(8)

The information processing apparatus according to (1) above, further including:

an environment recognition unit configured to generate a three-dimensional model of a space in which the video image is displayed, in which the coordinate system setting unit sets a spatial coordinate system on the basis of the three-dimensional model.

(9)

The information processing apparatus according to (8) above, in which the coordinate system setting unit sets the second input coordinate system in accordance with the spatial coordinate system.

(10)

The information processing apparatus according to (9) above, in which the coordinate system setting unit causes at least one axis of the spatial coordinate system to be substantially parallel to at least one axis of the second input coordinate system.

(11)

The information processing apparatus according to (9) or (10) above, in which in a case of moving a display position of the video image, the coordinate system setting unit sets the spatial coordinate system in accordance with a display surface on which the video image is displayed.

(12)

The information processing apparatus according to any one of (1) to (11) above, in which the coordinate system setting unit sets the first input coordinate system and the second input coordinate system on a same plane.

(13)

The information processing apparatus according to (12) above, in which the coordinate system setting unit makes an origin of the first input coordinate system and an origin of the second input coordinate system to be common.

(14)

The information processing apparatus according to any one of (1) to (13) above, in which the coordinate system setting unit sets the first input coordinate system for a first user operation of operating a content in the video image, and sets the second input coordinate system for a second user operation of moving a display position of the video image.

(15)

The information processing apparatus according to (14) above, in which the coordinate system setting unit sets the first input coordinate system for a third user operation of moving a display position of the video image within a predetermined range on a same display surface.

(16)

The information processing apparatus according to (14) or (15) above, in which the video image control unit controls a content in the video image on the basis of the first user operation in the first input coordinate system, and controls a display position of the video image on the basis of the second user operation in the second input coordinate system.

(17)

The information processing apparatus according to any one of (1) to (16) above, further including:

a drive control unit configured to control a drive mechanism of a drive-type display device including the drive mechanism used for moving a display position of the video image.

(18)

The information processing apparatus according to any one of (1) to (17) above, in which the coordinate system setting unit sets the first input coordinate system on the basis of an orientation of an operation body used for a user operation.

(19)

An information processing method including, by an information processing apparatus:

changing an input coordinate system on the basis of a user operation; and controlling a content in a video image on the basis of a first input coordinate system, and controlling a display position of the video image on the basis of a second input coordinate system.

(20)

A computer-readable recording medium on which a program for executing processing is recorded, the processing including:

changing an input coordinate system on the basis of a user operation; and controlling a content in a video image on the basis of a first input coordinate system, and controlling a display position of the video image on the basis of a second input coordinate system.

Note that the effects described in this specification are merely examples and are not limited, and other effects may be present.

REFERENCE SIGNS LIST

1 Information processing system
2 Room
11 Detection device
12 Information processing apparatus
13 Drive-type display device
101 Depth sensor
122 Operation body detection unit
123 Operation content recognition unit
124 Environment recognition unit
125 Coordinate system setting unit
126 Application control unit
127 Output control unit
141 Spatial coordinate system setting unit
142 UI coordinate system setting unit
143 Input coordinate system setting unit
151 Information processing unit
152 Video image control unit
161 Video image generation unit
162 Drive control unit
181 Projector
183 Depth sensor
184 Drive mechanism

The invention claimed is:

1. An information processing apparatus, comprising:
a coordinate system setting unit configured to:
receive information indicating one of a first user operation or a second user operation;
change a first input coordinate system to a second input coordinate system based on the second user operation; and
change the second input coordinate system to the first input coordinate system based on the first user operation; and
a video image control unit configured to:
control a content in a video image based on the first input coordinate system; and
control a display position of the video image based on the second input coordinate system.

2. The information processing apparatus according to claim 1, wherein the coordinate system setting unit is further configured to set the second input coordinate system based on a display surface on which the video image is displayed.

3. The information processing apparatus according to claim 2, wherein the coordinate system setting unit is further configured to control at least one of movement directions of an operation body used for the first user operation in the second input coordinate system to substantially coincide with at least one of movement directions of the video image on the display surface.

4. The information processing apparatus according to claim 2, wherein the coordinate system setting unit is further configured to change the second input coordinate system based on a change of the display surface.

5. The information processing apparatus according to claim 4, wherein in a case where the display position of the video image moves from a first display surface to a second display surface, the coordinate system setting unit is further configured to change the second input coordinate system based on the second display surface.

6. The information processing apparatus according to claim 5, wherein after the display position of the video image moves from the first display surface to the second display surface, the coordinate system setting unit is further configured to change the second input coordinate system after the movement of the display position of the video image stops.

7. The information processing apparatus according to claim 2, wherein in a case where the display surface is a curved surface, the coordinate system setting unit is further configured to set the second input coordinate system based on a plane that approximates the curved surface.

8. The information processing apparatus according to claim 1, further comprising an environment recognition unit configured to generate a three-dimensional model of a space in which the video image is displayed,
wherein the coordinate system setting unit is further configured to set a spatial coordinate system based on the three-dimensional model.

9. The information processing apparatus according to claim 8, wherein the coordinate system setting unit is further configured to set the second input coordinate system based on the spatial coordinate system.

10. The information processing apparatus according to claim 9, wherein the coordinate system setting unit is further configured to control at least one axis of the spatial coordinate system to be substantially parallel to at least one axis of the second input coordinate system.

11. The information processing apparatus according to claim 9, wherein the coordinate system setting unit is further configured to set the spatial coordinate system based on a display surface on which the video image is displayed and a movement of the display position of the video image.

12. The information processing apparatus according to claim 1, wherein the coordinate system setting unit is further configured to set the first input coordinate system and the second input coordinate system on a same plane.

13. The information processing apparatus according to claim 12, wherein the coordinate system setting unit is further configured to make an origin of the first input coordinate system and an origin of the second input coordinate system to be common.

14. The information processing apparatus according to claim 1, wherein the coordinate system setting unit is further configured to:
set the first input coordinate system for the first user operation to operate the content in the video image; and
set the second input coordinate system for the second user operation to move the display position of the video image.

15. The information processing apparatus according to claim 14, wherein the coordinate system setting unit is further configured to set the first input coordinate system for a third user operation to move the display position of the video image within a specific range on a same display surface.

16. The information processing apparatus according to claim 14, wherein the video image control unit is further configured to:
control the content in the video image based on the first user operation in the first input coordinate system; and
control the display position of the video image based on the second user operation in the second input coordinate system.

17. The information processing apparatus according to claim 1, further comprising a drive control unit configured to control a drive mechanism of a drive-type display device, wherein the drive mechanism moves the display position of the video image.

18. The information processing apparatus according to claim 1, wherein the coordinate system setting unit is further configured to set the first input coordinate system based on an orientation of an operation body used for the first user operation.

19. An information processing method, comprising:
by an information processing apparatus:
receiving information indicating one of a first user operation or a second user operation;
changing a first input coordinate system to a second input coordinate system based on the second user operation;
changing the second input coordinate system to the first input coordinate system based on the first user operation;
controlling a content in a video image based on the first input coordinate system; and
controlling a display position of the video image based on the second input coordinate system.

20. A non-transitory computer-readable medium having stored thereon computer-executable instructions which, when executed by a computer, cause the computer to execute operations, the operations comprising:
receiving information indicating one of a first user operation or a second user operation;
changing a first input coordinate system to a second input coordinate system based on the second user operation;
changing the second input coordinate system to the first input coordinate system based on the first user operation;
controlling a content in a video image based on the first input coordinate system; and
controlling a display position of the video image based on the second input coordinate system.

21. An information processing apparatus, comprising:
a coordinate system setting unit configured to:
change an input coordinate system based on a user operation, wherein the input coordinate system corresponds to one of a first input coordinate system or a second input coordinate system;
set the second input coordinate system based on a display surface on which a video image is displayed; and
change the second input coordinate system based on a change of the display surface; and
a video image control unit configured to:
control a content in the video image based on the first input coordinate system; and
control a display position of the video image based on the second input coordinate system.

* * * * *